United States Patent
Klee et al.

(10) Patent No.: US 11,314,566 B1
(45) Date of Patent: Apr. 26, 2022

(54) INTER-PROCESS COMMUNICATION FOR MICROKERNEL OPERATING SYSTEM

(71) Applicant: Facebook Technologies, LLC, Menlo Park, CA (US)

(72) Inventors: Christoph Klee, Snoqualmie, WA (US); Bernhard Poess, Redmond, WA (US); Sumit Kamath, Kirkland, WA (US)

(73) Assignee: Facebook Technologies, LLC., Menlo Park, CA (US)

(*) Notice: Subject to any disclaimer, the term of this patent is extended or adjusted under 35 U.S.C. 154(b) by 86 days.

(21) Appl. No.: 16/563,556

(22) Filed: Sep. 6, 2019

(51) Int. Cl.
*G06F 9/54* (2006.01)
*G06F 9/46* (2006.01)

(52) U.S. Cl.
CPC .............. *G06F 9/545* (2013.01); *G06F 9/461* (2013.01); *G06F 9/542* (2013.01); *G06F 9/544* (2013.01)

(58) Field of Classification Search
CPC .......... G06F 9/545; G06F 9/461; G06F 9/542; G06F 9/544
See application file for complete search history.

(56) References Cited

U.S. PATENT DOCUMENTS

| | | | | | |
|---|---|---|---|---|---|
| 5,675,829 | A | * | 10/1997 | Oskouy ................ | G06F 13/385 709/215 |
| 5,729,710 | A | * | 3/1998 | Magee .................... | G06F 9/544 711/203 |
| 2006/0075195 | A1 | * | 4/2006 | Stevens ................. | G06F 3/0607 711/145 |
| 2012/0311273 | A1 | * | 12/2012 | Marathe ................. | G06F 9/467 711/151 |
| 2019/0377613 | A1 | * | 12/2019 | Xuefeng ................. | G06F 9/544 |

OTHER PUBLICATIONS

Kothar Labs; Lock-Free IPC (/lock-free-ipc); https://kothar.net/lock-free-ipc; Wed, Mar. 16, 2011; 4 pages (Year: 2011).*
Love, Robert, *Linux system programming: talking directly to tlae kernel and C library.* "O'Reilly Media, Inc." Chapter 4, May 14, 2013.

* cited by examiner

*Primary Examiner* — Doon Y Chow
*Assistant Examiner* — Kimberly L Jordan
(74) *Attorney, Agent, or Firm* — Baker Botts L.L.P.

(57) ABSTRACT

In one embodiment, a method includes creating, by a computing device, an inter process communication (IPC) channel for communication from a producer process to a consumer process. The IPC channel includes a message buffer mapped to a first virtual address space of a kernel of an operating system and to a second virtual address space of the consumer process in a user space of the operating system. A sender handle for the message buffer is sent to the producer process. The kernel receives a request, which includes the sender handle, to send a message from the producer process to the consumer process through the IPC channel. Responsive to a determination that the request is permitted, the kernel writes the message to the message buffer using the sender handle, such that message written in the message buffer is accessible to the consumer process through the second address space.

20 Claims, 15 Drawing Sheets

INTER-PROCESS COMMUNICATION FOR MICROKERNEL OPERATING SYSTEM

TECHNICAL FIELD

This disclosure generally relates to operating systems of computing devices. More particularly, in certain embodiments, this disclosure is related to inter-process communications for a microkernel operating system.

BACKGROUND

An operating system of a computing device is generally a collection of software that facilitates user interaction with the computing device by managing and coordinating processes associated with the device software and hardware. An operating system may coordinate scheduling of tasks, use of processor time, use of system memory, communication with input/output devices, and the handling of other system resources. Operating systems generally include two virtual memory regions, one corresponding to a user space in which user-facing processes are executed and the other corresponding to a kernel space, which coordinates certain functions of the user-space processes and facilitates communication with device hardware.

SUMMARY OF PARTICULAR EMBODIMENTS

Conventional operating systems generally employ a monolithic kernel configuration to coordinate user-space processes and functions of system hardware. While this approach is sufficient for certain applications, operating systems with a monolithic kernel configuration present vulnerabilities with respect to system security and reliability. An alternative to the monolithic kernel configuration is the so-called "microkernel" configuration in which certain processes that would typically be handled in the kernel space (e.g., processes related to a device driver) are instead handled by user-space processes. The microkernel configuration provides isolation between user-space processes. Isolating processes as separate user-space entities may improve security and reliability, but communication between these isolated user-space processes can be resource intensive. For example, in a microkernel configuration, communications between processes pass through the microkernel via multiple system calls, and communications may require repeated copy (e.g., read and write) actions, which are resource intensive.

This disclosure encompasses the recognition of problems associated with previous implementations of operating systems, including microkernel operating systems, and also provides solutions to these problems. For example, conventional approaches to managing inter-process communication (IPC) and memory usage in an operating system are often inefficient (e.g., because they involve large numbers of system calls and/or copying actions) and/or insecure (e.g., because separate user-space applications are tightly coupled). For example, a process's security can be compromised when the process is tightly coupled to (e.g., via use of a shared memory region with) an untrusted process. This disclosure describes systems and methods for IPC and memory management which facilitate more efficient communication between user-space processes (e.g., via fewer copy actions and system calls), while maintaining separation between these process (e.g., such that an untrusted process cannot compromise other processes). As such, this disclosure satisfies the previously unrecognized need for IPC that involves fewer system calls and fewer file read and write actions, while still maintaining isolation between processes executed in the user space. The system and methods of the present disclosure may also be implemented into practical applications in which power efficiency is a concern. For instance, the systems and methods may particularly be integrated into applications involving portable systems, wearable systems, and/or artificial reality systems. While at times this disclosure refers to various systems and methods implemented in the context of a microkernel operating system, it should be understood that systems and methods described may also be applied with an operating system with a monolithic kernel configuration.

In particular embodiments, an IPC channel is created by a computing device for communication (e.g., one-way communication) from a producer process to a consumer process. The IPC channel includes a message buffer, which is mapped to a first virtual address space of a kernel of an operating system executed by the device and to a second virtual address space of the consumer process in a user space of the operating system. A sender handle is sent to the producer process for the message buffer. The kernel receives a request to send a message from the producer process to the consumer process through the IPC channel. The request includes the sender handle. Responsive to a determination that the request is permitted, the kernel writes the message to the message buffer using the sender handle such that the message written in the message buffer is accessible to the consumer process through the second address space.

In particular embodiments, an operating system executed by a computing device creates an IPC channel and a port for a process executed in a user space of the operating system. The IPC channel is associated with a key. The port includes a port buffer mapped to a first virtual address space of a kernel of the operating system and to a second virtual address space of the process. The operating system writes a message for the process in a message buffer associated with the IPC channel. The operating system determines whether the process is actively consuming messages in the message buffer based on one or more criteria. Responsive to determining that the process is not actively consuming messages, the operating system writes a notification packet in the port buffer. The notification packet includes an action type and the key, and the notification packet is configured to cause the process to consume the message based on the action type and the key.

In particular embodiments, a kernel of an operating system executing on a computing device receives a request to store a message to communicate from a first process to a second process using a circular buffer, which includes a first number of memory segments. The kernel determines an ownership of a first memory segment of the circular buffer, based on a corresponding first ownership segment of an ownership array for the circular buffer. The ownership array includes a second number of ownership segments, where the second number is the same as the first number. Responsive to determining that the first segment is available to (e.g., owned by) the first process, the kernel stores the message in the first memory segment. After storing the message in the first memory segment, the kernel changes the first ownership segment to indicate the first memory segment is owned by the second process.

In particular embodiments, a kernel of an operating system executing on a computing device receives a request to store a message in a message buffer, which includes a plurality of chunks. Each chunk of the message buffer is associated with a message-occupancy indicator. The kernel determines a start and end position of the message when stored in the message buffer. The kernel determines, based on the start and end positions, whether the message, when stored, will occupy more than one chunk. Responsive to determining that the message will occupy more than one chunk, the kernel determines each chunk that will contain the message when stored. If a message occupancy-indicator associated with each chunk indicates that at least each chunk after a first chunk associated with the start position is unoccupied, the kernel stores the message in the message buffer and updates the message-occupancy indicator for each chunk containing the stored message.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1:
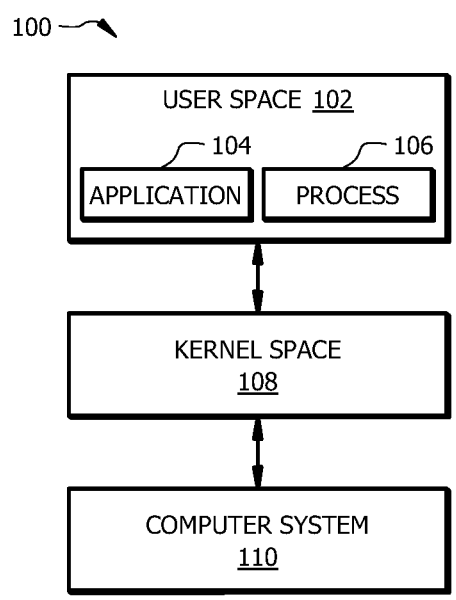
FIG. 1 illustrates an example operating system.

FIG. 1 shows an example operating system 100 in which kernel space or kernel 108 coordinates functions of applications 104 and/or processes 106 executed in user space 102 and coordinates implementation of hardware associated with computer system 108. In general, a process 106 may be an instance of an executed program, and an application 104 may be associated with a single process or more than one process. The user space 102 and kernel space 108 generally correspond to portions of virtual memory of the computer system 110. As described above, some operating systems employ a monolithic kernel configuration in which most activities of user-space processes 106 and/or applications 104 and communication with the hardware of computer system 110 is handled by the kernel 108. For instance, if kernel 108 is a monolithic kernel, it may include device drivers, file system management utilities, and the like. While this approach is sufficient for certain applications, use of an operating system with a monolithic kernel configuration may present significant vulnerabilities with respect to system security and reliability, for example, because any vulnerabilities or failures of the kernel components (e.g., a device driver) can result in kernel instability and subsequent system instability. An alternative to the monolithic kernel configuration is the microkernel configuration in which certain processes and/or tasks that would typically be handled by the kernel 108 (e.g., device driver processes) are instead executed in the user space 102. The isolated nature of user-space processes in a microkernel operating system generally improves system security and reliability. However, communication between applications 104 and/or processes 106 can be resource intensive.

Figure 2:
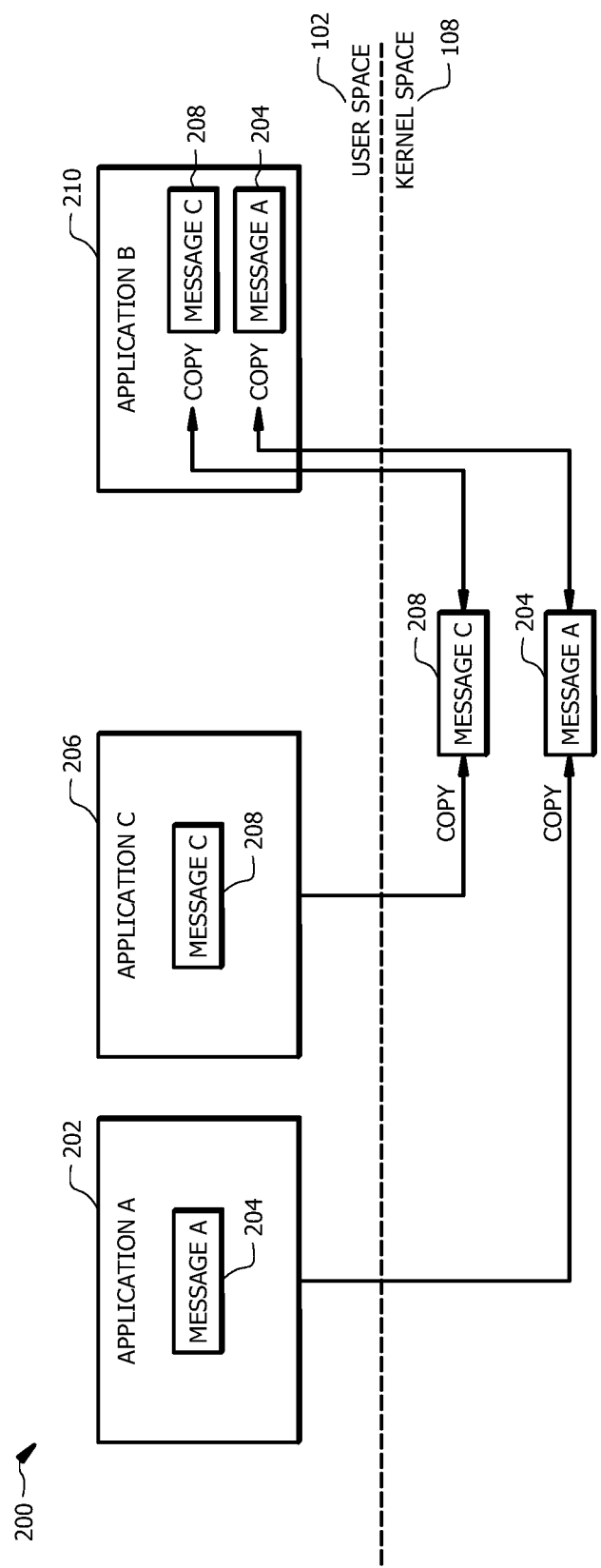
FIG. 2 illustrates an example of an IPC channel for communication between user-space applications, according to an illustrative embodiment of this disclosure.

FIG. 2 shows a diagram 200 illustrating communication between different applications 202, 206 and 210. As shown in FIG. 2, this conventional communication strategy involves repeated copy actions (e.g., read and write actions) and any associated system calls for performing and/or coordinating the communication of each message 204, 208. This results in reduced communication efficiency. In order for a first application 202 to send a message 204 to a second application 210, the message 204 is first copied to memory associated with the kernel 108. This copy action may, for example, involve a system call associated with a request, which is transmitted to the kernel 108, to send the message 204 to the second application 210. In order for the second application 210 to read the message 204, the message 204 is copied to a separate memory space associated with the second application 210 via one or more system calls between the kernel 108 and the second application 210. This approach to IPC is generally bi-directional, such that the second application 210 can also send information to the kernel 108 via additional system calls and or copy actions (e.g., to confirm that the message 204 was received and/or read).

As shown in FIG. 2, a second message 208 can similarly be communicated from a third application 206 to the second application 210 using the same or a similar approach which involves multiple copies of the second message 208 and any requisite or related system calls for managing the copy actions. Each system call and copy action used in the IPC scheme illustrated in FIG. 2 is generally resource intensive, resulting in a waste of both processing resources and power. A possible approach to avoiding the multiple-copy and multiple-system call IPC mechanism described above with respect to FIG. 2, is to establish a memory region that is shared by a producer process (e.g., application 204 of FIG. 2) and a consumer process (e.g., application 210 of FIG. 2). However, this approach has several drawbacks. This approach may compromise the security and reliability of the operating system because potentially malicious (e.g., untrusted) processes are required to share memory with other processes, resulting in vulnerabilities. The present disclosure encompasses the recognition of the need for an operating system that is configured not only for more efficient communication between user-space processes (i.e., more efficient IPC channels for such communication that requires fewer system calls and fewer copy actions) but also for maintaining isolation between the user-space processes.

The IPC channel described in this disclosure overcomes drawbacks and limitations of previous approaches, including those described above. As described in this disclosure, the memory, or pages of memory (e.g., blocks of virtual memory) allocated to an IPC message buffer (e.g., for holding messages, handles, data, etc.) is mapped to both a virtual address space of the kernel and a virtual address space of a consumer process (e.g., a process that is to receive a message). To further improve security and reliability, the kernel may have read and write (R/W) access to the message buffer, while the consumer process only has read (R) access. When a producer process sends a message, it requests the kernel to enqueue the message in the buffer via a system call. Since the same physical memory of the buffer is also mapped to the virtual address space of the consumer process, the consumer process can directly read the message without issuing a system call and without requiring an additional copy of the message. Therefore, one-way communication can be established using a single system call while maintaining the desired level of security and reliability associated with the separate producer and consumer processes.

IPC-Port Model

Figure 3:
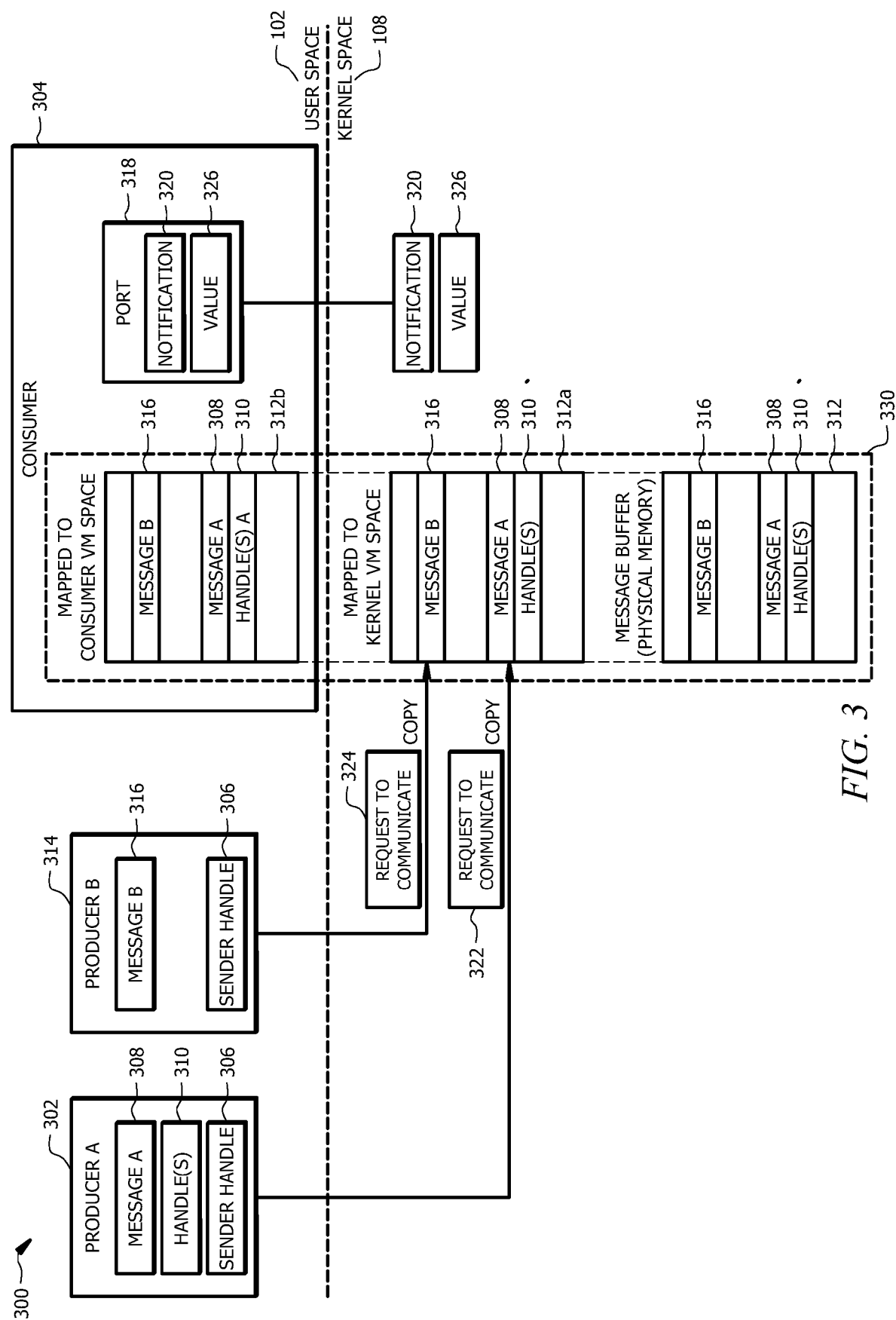
FIG. 3 illustrates an example of an IPC channel for communication between user-space applications, according to another illustrative embodiment of this disclosure.

FIG. 3 shows a diagram 300 that illustrates an example IPC channel 330 providing communication between a first producer process 302 and a consumer process 304. The IPC channel 330 includes a message buffer 312 that is mapped to a first virtual address space (message buffer mapping 312a) of the kernel 108 and to a second virtual address space of the consumer process 304 in user space 102 (message buffer mapping 312b). As shown in FIG. 3, the first producer process 302 receives a sender handle 306 associated with message buffer mapping 312a of the IPC channel 330. The kernel 102 receives a request 322 to send a message 308 from the first producer process 302 to the consumer process 304 through the IPC channel 330. The request 322 generally includes the sender handle 306a. If the request 322 is permitted (e.g., based on whether the sender handle 306a is associated with the message buffer 312a, or any set predefined rules and/or criteria associated with the IPC channel 330), the message 308 and any optional handles 310 associated with message 308 are written (e.g., copied) to the message buffer 312. Handles 310 may be associated with any resource used by the consumer process 304, the producer process 302, and/or the kernel 108 such as a file descriptor, a process identifier, a job identifier, or the like associated with the message 308. The sender handle 306a generally provides permission to write the message 308 to the appropriate message buffer 312, which is accessible to the consumer process 304 via the virtual address space-mapped buffer 312b. In other words, the message 308 written in virtual address space-mapped buffer 312a of the kernel 108 is accessible to the consumer process 304 through the message buffer 312b mapped to the consumer processes' virtual address space. A second producer process 314 may also communicate, via a second request 324, using the same message buffer 312 and a sender handle 306b. Sender handle 306b references the same IPC channel 330 as is referenced in sender handle 306a. In some embodiments, sender handle 306b is the same as sender handle 306a. In the illustrative example of FIG. 3, producer process 314 sends a second message 306 without any associated handles.

In some embodiments, the message buffer 312 has a limited fixed memory size. For example and as described in greater detail below, the message buffer 312 may be a circular buffer (e.g., a ring buffer). For example, a circular buffer may be a memory buffer that operates as though it were connected end-to-end (e.g., such that a process reading information from the buffer may proceed from top to bottom and return to the top upon reaching the bottom of the buffer). Examples of circular buffers and their implementation as a circular queue and for efficient memory management are described in greater detail below, for example, with respect to FIGS. 8-11. A message buffer 312 with a fixed memory size generally can store a fixed number of messages 308, 316. Generally, the sender handles 306a,b associated with the IPC channel 330 can be provided to multiple producer processes, including but not limited to producer processes 302 and 314. However, in some embodiments, a dedicated IPC channel may be used for communication between a single producer process and a single consumer process.

Figure 4:
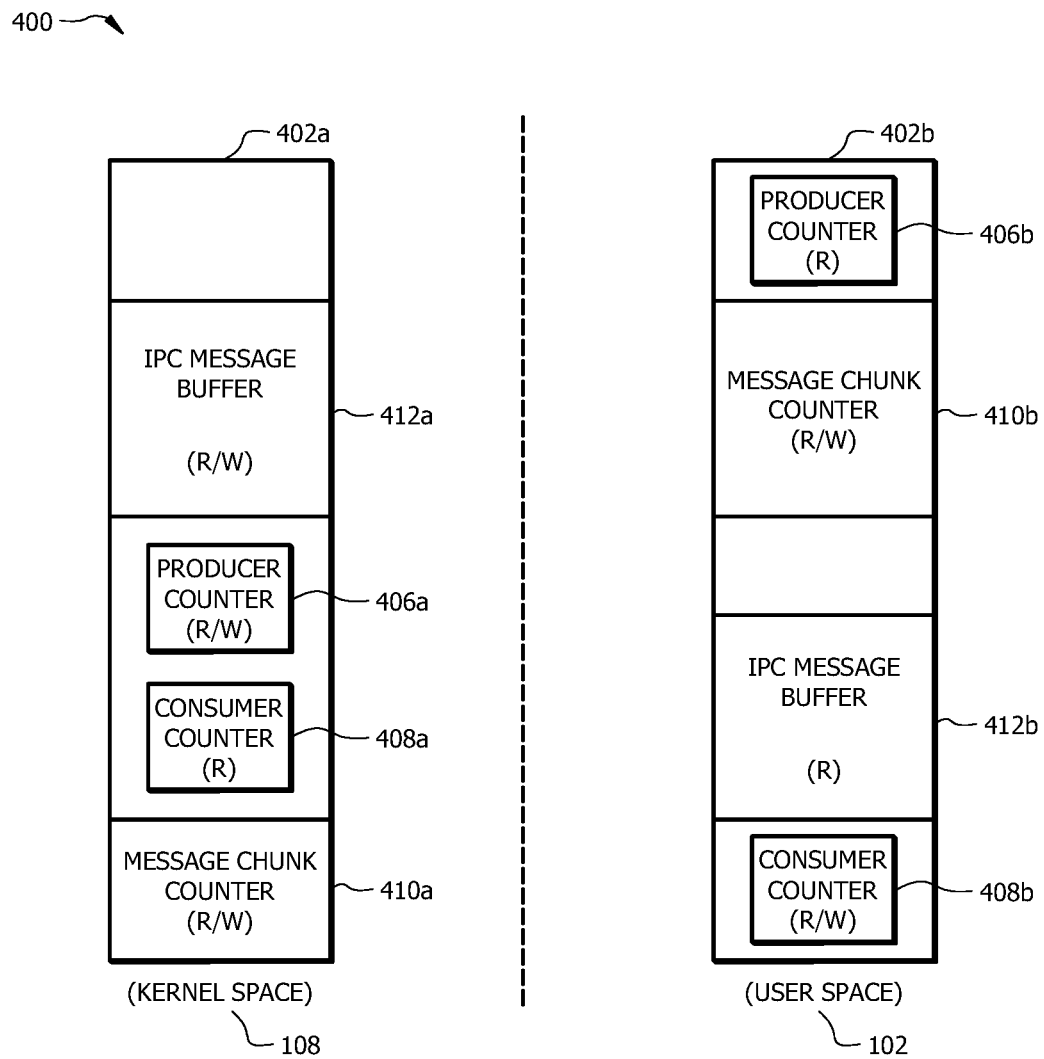
FIG. 4 illustrates an example method for creating and using an IPC channel, according to an illustrative embodiment of this disclosure.

In some embodiments, the message buffer 312 is a memory portion of a larger memory buffer, which is configured to store other information related to coordinating and/or monitoring communications over the IPC channel 330 and managing the message buffer 312. FIG. 4 illustrates such an extended memory buffer 400 which is mapped to virtual memory of the kernel space 108 (mapped memory buffer 402a) and virtual memory of the user space 102

(mapped memory buffer 402b). The kernel space-mapped memory buffer 402a and the consumer-process mapped memory buffer 402b each includes message buffers 312a and 312b, respectively. The mapped memory buffers 400a,b may also include a producer counter 406a,b, a consumer counter 408a,b, and a message chunk counter 410a,b for kernel space 108 and user space 102, respectively. The producer counter 406a,b counts the number of messages produced by the producer process 302. For example, the producer counter 406a,b may include one or more values corresponding to a potential location of the next available segment in which messages may be stored in the message buffer 312a,b. The consumer counter 408a,b may include one or more values associated with a location in the message buffer 312a,b of one or more messages ready to be consumed by the consumer process 304. The consumer counter 408a,b may include one or more values corresponding to the number of messages consumed from the message buffer 312 by the consumer process 304. The message chunk counter 410a,b may act as a "state buffer" indicating a consumption state of each message stored in the message buffer 312a,b. For example, the consumption state may be associated with whether or not each message has been consumed by the consumer process 304. Further examples of consumer and producer counters and their use are described in greater detail below with respect to FIGS. 8-12.

While virtual address spaces 402a and 402b are generally different, they are still mapped to the same physical memory corresponding to memory buffer 400. To ensure the integrity and security of communications transferred using IPC channel 330, the kernel 108 and the user space 102 (i.e., and consumer process 304) may have different read and write access rights for the different components of their corresponding virtual memory buffers 400a,b (i.e., different privileges to modify the various buffer regions). For instance, the consumer process 304 of the user space 102 may have read (R) access to messages stored in the message buffer 312b, while the kernel 108 may have read and write (R/W) access to the message buffer 312a. As shown in FIG. 4, the user space 102 may have read (R) access to the producer counter 406b, while the kernel 108 may have read and write (R/W) access for the producer counter 406b. The kernel 108 may have read (R) access for the consumer counter 408a, while the user space may have read and write (R/W) access for the consumer counter 408b. These various read-write restrictions or rules prevent user-space processes from compromising the security and reliability of information stored in the message buffer 312a,b. Generally, the message chunk counter 410a,b can be read and written to by both the kernel 108 and the processes of the user space 102. Additional and/or alternative features of memory buffers, such as memory buffer 400, are described in greater detail below, for example, with respect to FIGS. 10 and 11.

Referring again to FIG. 3, in some embodiments, the IPC channel 330 is associated with a port 318. The port 318 may be configured to provide a guarantee that messages 308 and/or 316 are read by the consumer process 304. For example, in order for the kernel 108 to confirm that one or both of messages 302 and 316 have been read, the kernel 108 may send the consumer process 304 a value 326 (e.g., the current CPU count) along with a port notification 320. For instance, after the consumer process 304 reads messages 308 and/or 316, the consumer process 304 may write the value 326 into a designated memory location (e.g., in a memory location associated with port 318 as shown) so that the kernel 108 knows whether a wakeup notification should be sent to the consumer process 304. Details of various implementations of ports, including 318, and uses of port notifications are described in greater detail below with respect to FIGS. 6 and 7.

Still referring to FIG. 3, in some embodiments, the IPC channel 330 facilitates the use of asynchronous system calls. Thus, the producer processes 302, 314 and consumer process 304 are not necessarily required to share a synchronized clock for IPC and coordination of system activities. Instead, a given function may, for example, be performed in response to receipt of a signal or message for initiating the function (e.g., messages 308 and/or 316, e.g., port notification 320). Receipt of message 306 or notification 320, for example, may cause the consumer process 304 to initiate a corresponding processing task. For instance, receipt of a port notification 320 may cause the consumer process 304 to begin reading any pending messages (e.g., messages 308 and 316) in the message buffer 312.

In contrast to the bi-directional IPC mechanism described above with respect to FIG. 2, IPC channel 330 generally facilitates one-way (i.e., unidirectional) communication from the consumer processes 302 and/or 314 to the consumer process 304. It should be understood, however, that two-way communication can be achieved via the creation of an equivalent IPC channel to that shown in FIG. 3, where the second IPC channel includes a memory buffer that is mapped to a virtual address space of the kernel 108 and to a virtual address space of the producer process(es) 302 and/or 314.

Figure 5:
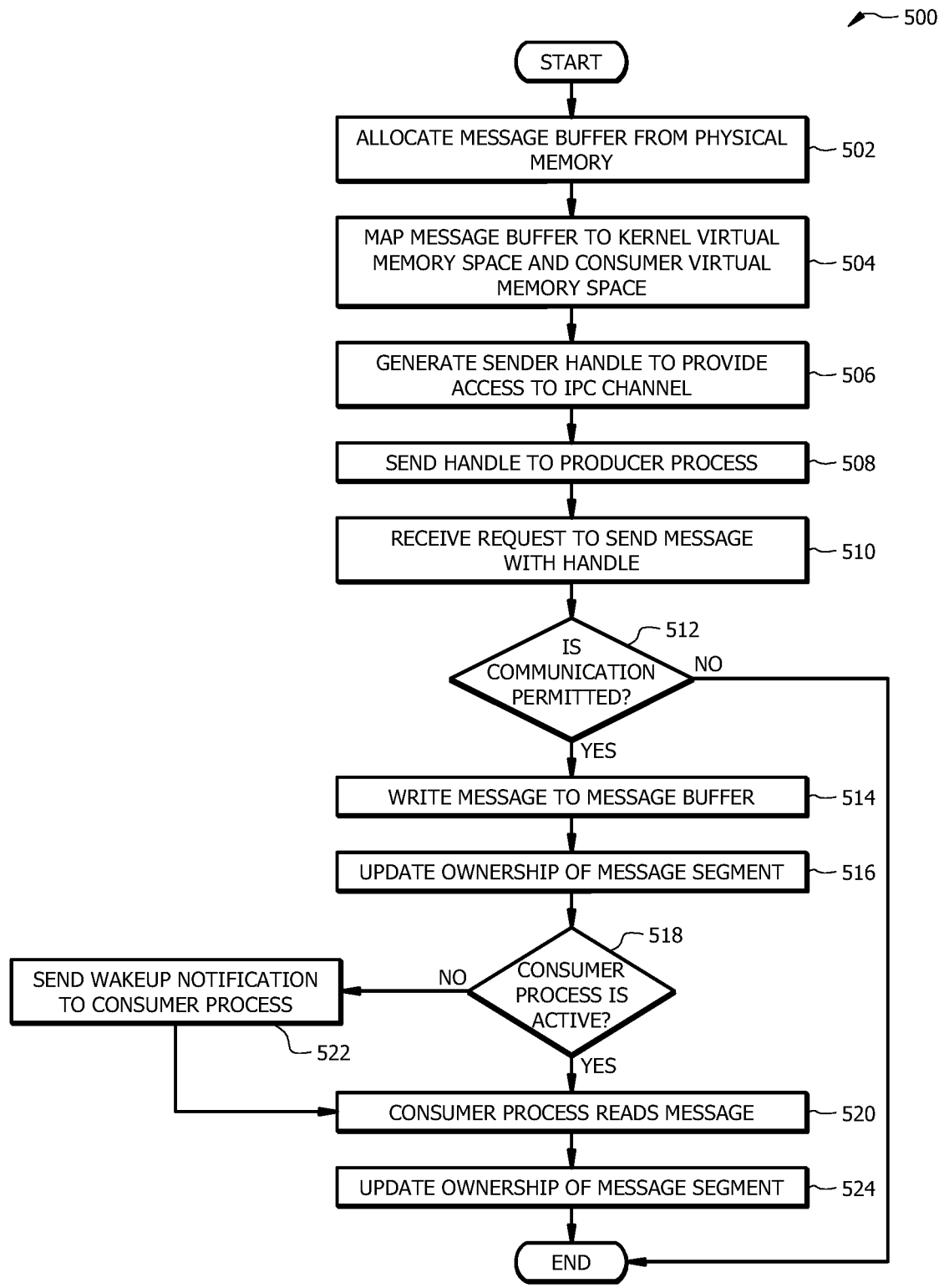
FIG. 5 illustrates an example of a shared memory buffer, according to an illustrative embodiment of this disclosure.

FIG. 5 illustrates an example method 500 of creating an IPC channel 330 and communicating using the IPC channel 330. The method may begin at step 502, where a portion of memory is allocated to a message buffer 312. The portion of memory allocated for message buffer 312 may generally be a continuous or discontinuous portion of physical memory of the computer system 110 shown in FIG. 1 (e.g., memory 1204 of FIG. 12). In general, the message buffer 312 may be allocated according to any appropriate allocation rules of the system 110 and/or kernel 108. For example, the message buffer 312 may be allocated to the next available portion or portions of system memory.

At step 504, the message buffer 312 is mapped to the virtual address space 312a of the kernel 108 and to the virtual address space 312b of the consumer process 304. The message buffer 312 may be mapped to any appropriate virtual address space as determined, for example, by mapping rules associated with the kernel 108, the user space 102, and/or the consumer process 304. For example, the mapping rules may define how the virtual memory addresses used by the consumer process 304 should be associated with the physical memory addresses of the computer system 110 (e.g., of memory 1204 illustrated in FIG. 12). At step 506, a sender handle 306a is generated. The sender handle 306a is associated with the message buffer 312 and the consumer process 304. The sender handle 306a is generally configured to link or associate a communication request with the particular IPC channel 330 and message buffer 312, which facilitates communication with the consumer process 304. The sender handle 306a may include any appropriate identifying information associated with the message buffer 312 and/or the consumer process 304 that may be used to confirm that the sender handle 306a is associated with the IPC channel 330.

At step 508, the sender handle 306a, which is associated with the message buffer 312, is sent to the producer process 302. The producer process 302 may store the sender handle 306a for subsequent use in communicating via the IPC channel 330. At step 510, the kernel 108 receives a request 322 to send the message 308 from the producer process 302 to the consumer process 304 using the IPC channel 330, or as part of the thread start up. The request 322 generally includes the sender handle 306a, described above.

At step 512, a determination is made of whether communication is permitted between the producer process 302 and the consumer process 304. For example, the kernel 108 may determine whether the sender handle 306a corresponds to (e.g., matches or approximately matches) a predefined sender handle associated with the IPC channel 330. For example, in some embodiments, the sender handle 306a may be the same as a handle generated by the IPC channel 330. In other embodiments, the sender handle 306a approximately matches the predefined handle by including a reference to the IPC channel 330 that is also included in the predefined handle. If the sender handle 306 corresponds to the predefined sender handle, the kernel 108 determines that the producer process 302 is permitted to request communication with the consumer process 304. Otherwise, if the request 322 is not permitted (e.g., if the sender handle 306 does not correspond to the predefined sender handle associated with the IPC channel 330), the kernel 108 terminates the method 500.

At step 514, responsive to a determination that the request 322 is permitted in step 512, the kernel 108 writes the message 308 to the message buffer 312 using the sender handle 306. The message 308 written in the message buffer 312 is accessible (e.g., readable) to the consumer process 304 through the second address space-mapped message buffer 312b. At step 516, after the message 308 is written to the message buffer 312, ownership of the portion of the message buffer 312 associated with the written message may be updated to indicate that the segment is owned by the consumer process. For example, an ownership array associated with the message buffer 312 may be updated, as described in greater detail below with respect to FIGS. 8-10.

At step 518, the kernel 108 may determine whether the consumer process 304 is active (e.g., actively consuming messages). For example, after the consumer process 304 reads a final message, the consumer process 304 may write a value 326 into a designated memory location (e.g., in a memory location associated with port 318 as shown in FIG. 3) or send a system call to the kernel 108, so that the kernel 108 knows that all messages were read and that the process 304 has entered an inactive, or "wait," state. An activity monitoring utility (e.g., such as activity monitor 610 of FIG. 6, described below) may also or alternatively monitor an activity state of the consumer process 304, thereby allowing the kernel 108 to determine whether the consumer process 304 is active.

At step 520, if the consumer process 304 is active, the consumer process 304 will generally consume (e.g., read) the written message 308. The consumer process 304 may consume the message 308 without issuing a system call to the kernel 108. At step 522, responsive to a determination that the consumer process 304 is not active, a wakeup notification may be sent to the consumer process 304. The wakeup notification (e.g., notification 320 of FIG. 3) is generally configured to cause the consumer process 304 to begin consuming messages stored in the message buffer 312b mapped to the virtual memory space of the consumer process 304. The wakeup notification may be specific to the message buffer 312 and thereby cause the consumer process 304 to preferentially consume messages associated with IPC channel 330. Alternatively, the wakeup notification may be more general and cause the consumer process 304 to begin consuming messages stored in any message buffer associated with the consumer process 304. For instance, messages stored in any one or more message buffers associated with the consumer process 304 (including but not limited to message buffer 312 of FIG. 3). The messages may be consumed in any appropriate order (e.g., based on message handle(s) 310 that indicate a message priority, e.g., in the order in which the messages were received).

At step 524, after the message 308 is consumed, the consumer process 304 may update an ownership of the portion of the message buffer 312 associated with the consumed message may be updated to indicate that the portion is available for writing a new message. For instance, an ownership array associated with the message buffer 312 may be updated, as described in greater detail below with respect to FIGS. 8-10.

Particular embodiments may repeat one or more steps of the method of FIG. 5, where appropriate. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates an example method for creating and using an IPC channel, including the particular steps of the method of FIG. 5, this disclosure contemplates any suitable method for creating and using an IPC channel including any suitable steps, which may include all, some, or none of the steps of the method of FIG. 5, where appropriate. Furthermore, although this disclosure may describe and illustrate particular components, devices, or systems carrying out particular steps of the method of FIG. 5, this disclosure contemplates any suitable combination of any suitable components, devices, or systems carrying out any suitable steps of the method of FIG. 5. While certain embodiments of the systems and methods described above are described with respect to implementation in a microkernel operating system, it should be understood that the systems and methods may be employed in a monolithic kernel operating system.

Port Notifications

As described above with respect to FIG. 3, a port (e.g., port 318) may provide a mechanism for sending event notifications to user-space processes (e.g., consumer process 304). For example, for the IPC channel 330 described above, even though the consumer process 304 can read messages 308 and/or 316 from its virtual address space-mapped message buffer 312b without issuing a system call, some notification of the presence of a pending message may in some cases be helpful. For example, the consumer process 304 may not be aware that messages 308 and/or 316 have been written to the message buffer 312. The process 304 may also or alternatively be in an inactive state (e.g., a wait state) such that the process 304 is not consuming messages. An appropriate port notification (e.g., port notification 320 of FIG. 3) can inform the consumer process 304 of the presence of one or more messages (e.g., messages 308 and/or 316) in the message buffer 312 and, if needed, cause the process 304 to consume the messages.

Figure 6:
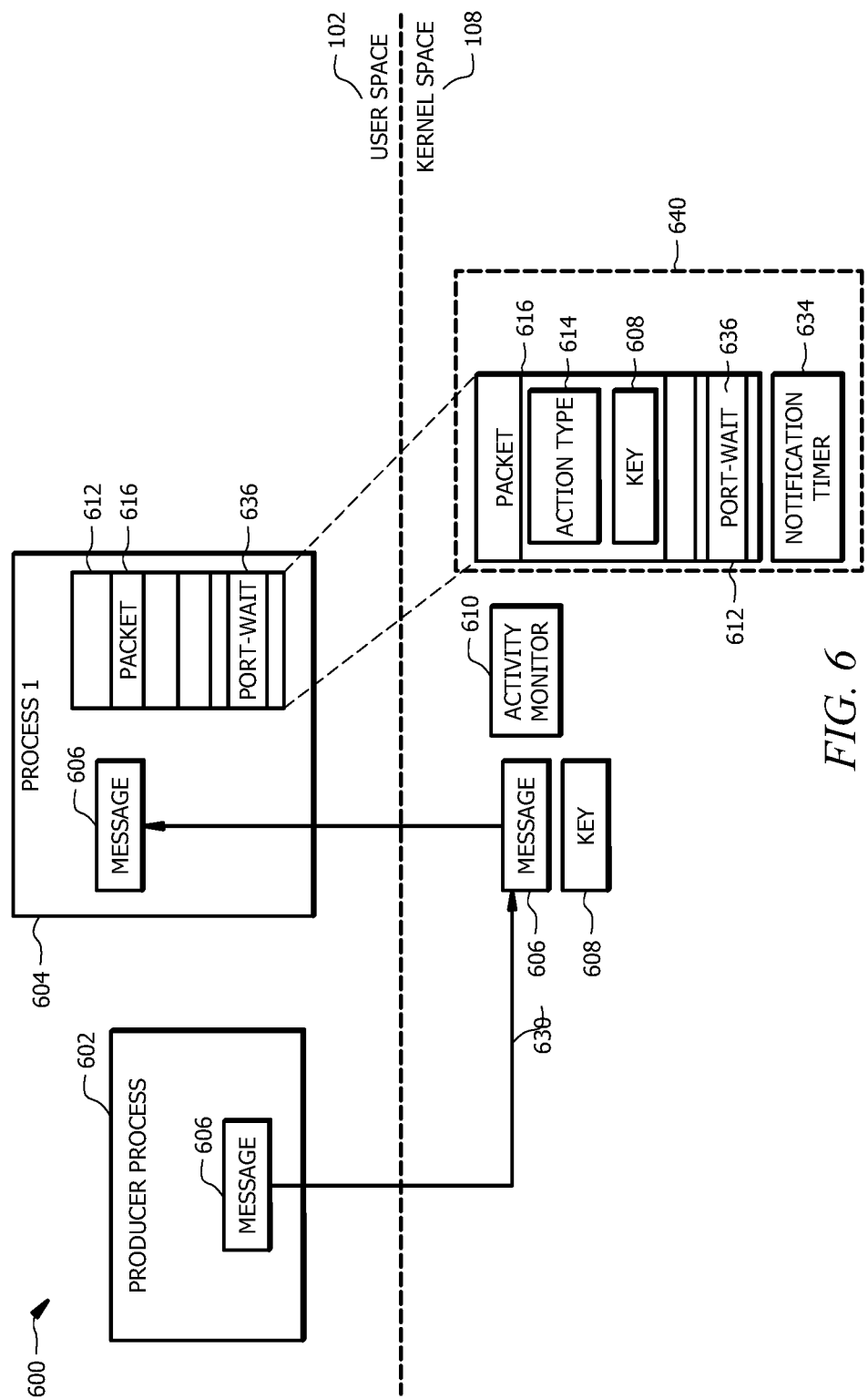
FIG. 6 illustrates an example port notification mechanism, according to an illustrative embodiment of this disclosure.

FIG. 6 is a diagram 600 illustrating a port 640. The port 640 may be used to implement port 318 of FIG. 3. While the port 640 is primarily described in the context of the IPC channel 330 described with respect to FIG. 3, the port 640 may also be implemented in any other appropriate operating system context including, for example, an operating system employing a conventional IPC channel like that described with respect to FIG. 2 above. The port 640 of FIG. 6 can be employed with a monolithic kernel or a microkernel operating system. Port 640 generally informs the user-space process 604 that some action should be taken (e.g., reading messages in a shared message buffer space).

The port 640 is implemented as a physical memory space to which virtual address spaces of both the process 604 and the kernel 108 map, as depicted in FIG. 6. The port 640 includes a port buffer 612 and an optional notification timer 634. Generally, the notification timer 634 may be part of port 640 or associated with port 640, as appropriate for a given implementation. When the process 604 creates the port 612, the kernel may be informed of an action type 614, or event type, of interest (e.g., reading a pending IPC message 606) and a key 608, which is included in port notification packet 616 to inform the process 604 that IPC channel 630 is associated with notification packet 616. The key 608 is associated with the IPC channel 630, which is used to send the message 606. For example, the key 608 may be associated with the IPC channel 630 representation in the kernel 108, such that there is a one-to-one mapping between the port 640 and the IPC channel 630. In some embodiments, a hash table may be stored in memory and used to identify which key 608 is associated with which IPC channel 630. Generally, a separate port is not required for each IPC channel that is associated with a given process. For example, port 640 may be associated with one or more additional IPC channels used by process 604. However, in some embodiments, each IPC channel can have its own dedicated port. In some embodiments, only the process 604 that creates the port 640 can close the port 640 (e.g., clear the physical memory associated with the port buffer 612 and/or un-map virtual address spaces from this physical memory).

In some embodiments, the port buffer 612 has a limited, fixed-size memory. The port buffer 612 may also include or be associated with a notification timer 634, which can be initiated when a notification packet 616 is sent and used to determine when and/or if a notification packet 616 should be resent (e.g., if a process does not become active after a predefined time from when the notification packet was sent or if the notification was not successfully sent on the previous attempt). In some embodiments, each notification packet 616 has the same fixed size. In other embodiments, notification packets may have different sizes. In some embodiments, the port buffer 612 has a circular queue structure such that notifications written to the buffer 612 cannot be pre-empted and processing activities are not halted in response to writing any given notification packet 616.

In an example operation of the port 640, the kernel 108 posts a notification packet 616 to the port 612, which is accessible to the process 604, to inform the process 604 of a pending message 606 received from a producer process 602. In some embodiments, the notification packet 616 may be generated based on an activity state of the process 604. For example, an activity monitor 610 may determine whether the process 604 is consuming IPC messages. For example, the activity monitor 610 may monitor activities of the process 604 to determine whether the process 604 is in an active state (e.g., reading messages) or a waiting state (e.g., corresponding to not reading messages). This determination may be based on one or more criteria, which include, for example, whether processing resources are being allocated to process 604, whether processor time is being allocated to process 604, whether process 604 has issued a call corresponding to entering a waiting or inactive state, and whether message 606 has been available for consumption for greater than a threshold time. For instance, the activity monitor 610 may determine the activity state of the process 604 based on a call to the kernel 108 to request information about usage of processing resources and/or a value written to the port buffer 612 by the process 604. For example, the process 604 may issue a call to the port or elsewhere indicating that the process 604 will enter/has entered an inactive or "wait" state. The process 604 uses the notification packet 616 to cause the process 604 to begin consuming messages.

In another example operation of the port 640, the producer process 602 writes the first message 606 to the port buffer 612 (e.g., which may be configured the same as or similar to the message buffer 312 of FIG. 3). The activity monitor 610 of the kernel 108 determines an activity state of the process 604 to determine whether the process 604 is reading messages from the corresponding IPC channel 630. A port notification packet 616 may be written to cause the process 604 to begin reading messages associated with the IPC channel 630 and, optionally, other IPC channels associated with the process 604. If there is a page fault at the port 612, the kernel 108 may send a notification packet 616 to the consumer process 604 to inform the process 604 about the page fault. When the process 604 has completed reading messages or if the process 604 otherwise stops reading messages, the process 604 may write a port-wait notification 636 to the port buffer 612. The port-wait notification 636 informs the kernel 108 that the process 604 is inactive. While generally, a port notification packet 616 may only be sent by the kernel 108 when the process 604 is not actively consuming messages, in some embodiments, a port notification packet 616 is sent following the receipt of each IPC message 606 (i.e., to inform the process 604 of each incoming message 606).

While the illustrative example of FIG. 6 is described primarily with respect to port notification packet 616 associated with causing process 604 to consume a corresponding message 606, it should be appreciated that port notification packet 616 can also or alternatively be related to other system processes. For example, port notification 616 may be associated with system interrupts (e.g., events requiring immediate processing resources). For example, notification packet 616 may be related to an instantaneous user input (e.g., typing on keyboard or any other input from an input device). Port notification packet 616 may be associated with a non-maskable interrupt. For instance, a notification 616 may be associated with a timer, a hardware error, an impending system reset, or the like that should be handled by a user space process.

Figure 7:
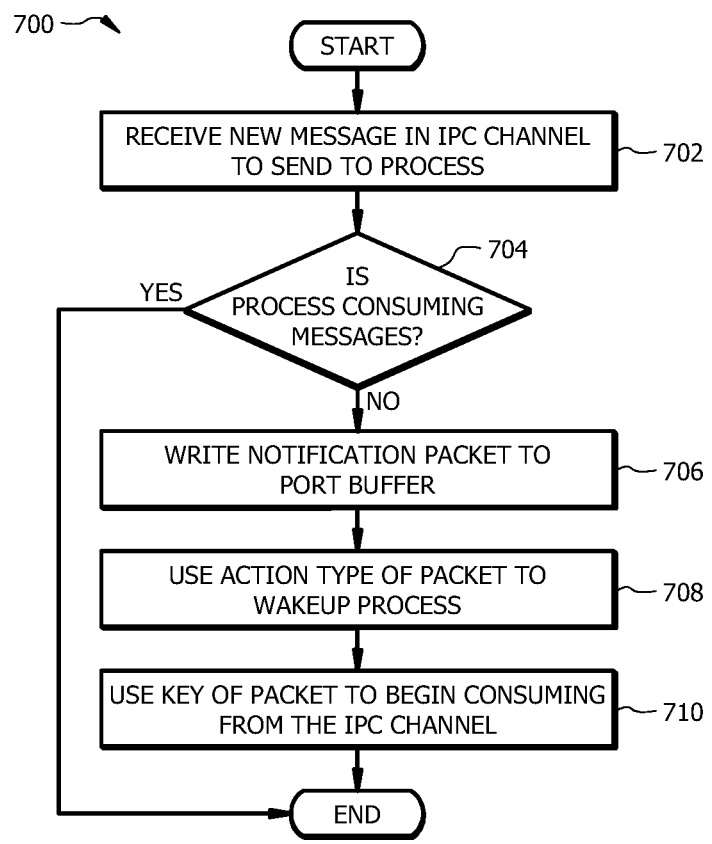
FIG. 7 illustrates an example method of sending a port notification, according to an illustrative embodiment of this disclosure.

FIG. 7 illustrates an example method 700 of operating a port (e.g., such as port 640 shown in FIG. 6). For example a notification packet, such as packet 616 may be sent to wake up a process (e.g., process 604 of FIG. 6) to begin consuming pending messages. The method 700 may begin at step 702, where the kernel 108 receives an IPC message 606 for process 604. The message 606 may be received via the IPC channel 330 described above with respect to FIG. 3 or any other IPC channel mechanism (e.g., the bi-directional, multiple-copy IPC channel configuration described with respect to FIG. 2).

At step 704, the kernel 108 determines whether the process 604 is consuming messages. This determination may be made, for example, by the activity monitor 610 or any other appropriate resource of the kernel 108. The determination may be based on a port-wait notification 636 or another call sent from the process 304 when the process 604 stopped consuming messages. The determination may be general and initiate the consumption of any pending messages by the process 604 (i.e., a determination of whether the process 604 is reading any messages) or an IPC channel-specific determination (i.e., a determination of whether the process 604 is reading messages associated specifically with the IPC channel 630 used to send message 606). If the process 604 is determined at step 704 to already be consuming messages, the kernel 108 generally terminates method 700, and a port notification packet 616 is not sent. Otherwise, if the process 604 is not consuming messages, the kernel 108 proceeds to step 706.

At step 706, the kernel 108 writes a notification packet 616 to the port buffer 612. As described above, the notification packet 616 includes or is associated with an action type 614 and a key 608. The key 608 is associated with the IPC channel 630 through which the message 606 was sent. As shown in FIG. 6, the notification 616 is accessible via the port buffer 612 in both a virtual memory space of the kernel 108 and in a virtual memory space of the process 604.

At step 708, the process 604 is caused to become active or to "wakeup" in response to the written port notification packet 616. In particular, the action type 614 of the notification packet 616 may be used to cause the process 604 to become active to consume messages. For example, the action type 614 may correspond to the action of "beginning to consume IPC messages." Accordingly, the process 604 may enter an active state and may consume messages from one or more IPC channels associated with the process 604, including but not limited to IPC channel 630. At step 710, the process 604 uses the key 608 to be granted permission to consume message 606 from the IPC channel 630, and begins consuming message 606 and, optionally, any other messages associated with the IPC channel 630.

Particular embodiments may repeat one or more steps of the method of FIG. 7, where appropriate. Although this disclosure describes and illustrates particular steps of the method of FIG. 7 as occurring in a particular order, this disclosure contemplates any suitable steps of the method of FIG. 7 occurring in any suitable order. Moreover, although this disclosure describes and illustrates an example method for operating a port, including the particular steps of the method of FIG. 7, this disclosure contemplates any suitable method for operating a port including any suitable steps, which may include all, some, or none of the steps of the method of FIG. 7, where appropriate. Furthermore, although this disclosure may describe and illustrate particular components, devices, or systems carrying out particular steps of the method of FIG. 7, this disclosure contemplates any suitable combination of any suitable components, devices, or systems carrying out any suitable steps of the method of FIG. 7.

Circular Queue

As described above, since user-space processes in a microkernel architecture are isolated, a mechanism is generally needed for communication amongst these processes. However, communication through system calls or conventional IPC channels (e.g., as illustrated in FIG. 2) is generally resource intensive. For port notifications (e.g., based on notification packets 616, 626 of FIG. 6), there is also a need to ensure that notifications in the port (e.g., port 640 of FIG. 6) are not being overwritten before they are read. Since a port may be used for event notification by different processes, each producer process may be allowed to reserve a port, helping to guard against producers overwriting each other. However, this alone is not generally sufficient to ensure that port notifications are not overwritten, because notifications for a given producer process may be overwritten before notifications are read. One way to prevent this problem is for a newer notification in the port buffer to wait for the consumption of previous notifications. However, waiting is undesirable and can result in poor system performance. Requiring waiting is also not interrupt safe such that, for example, if a new message or notification is in an interrupt (e.g., wait) state, the system may not proceed with other tasks.

In certain embodiments, a specially configured circular queue is employed to facilitate wait-less and interrupt-safe communication between processes. The circular queue may be employed with respect to any one or more of the message buffer 312 of FIG. 3, the memory buffer 500 of FIG. 5, and the port buffer 612 of FIG. 6. In other words, the circular queue described in this disclosure may be used for IPC channel communication and/or port notification.

Figure 8:
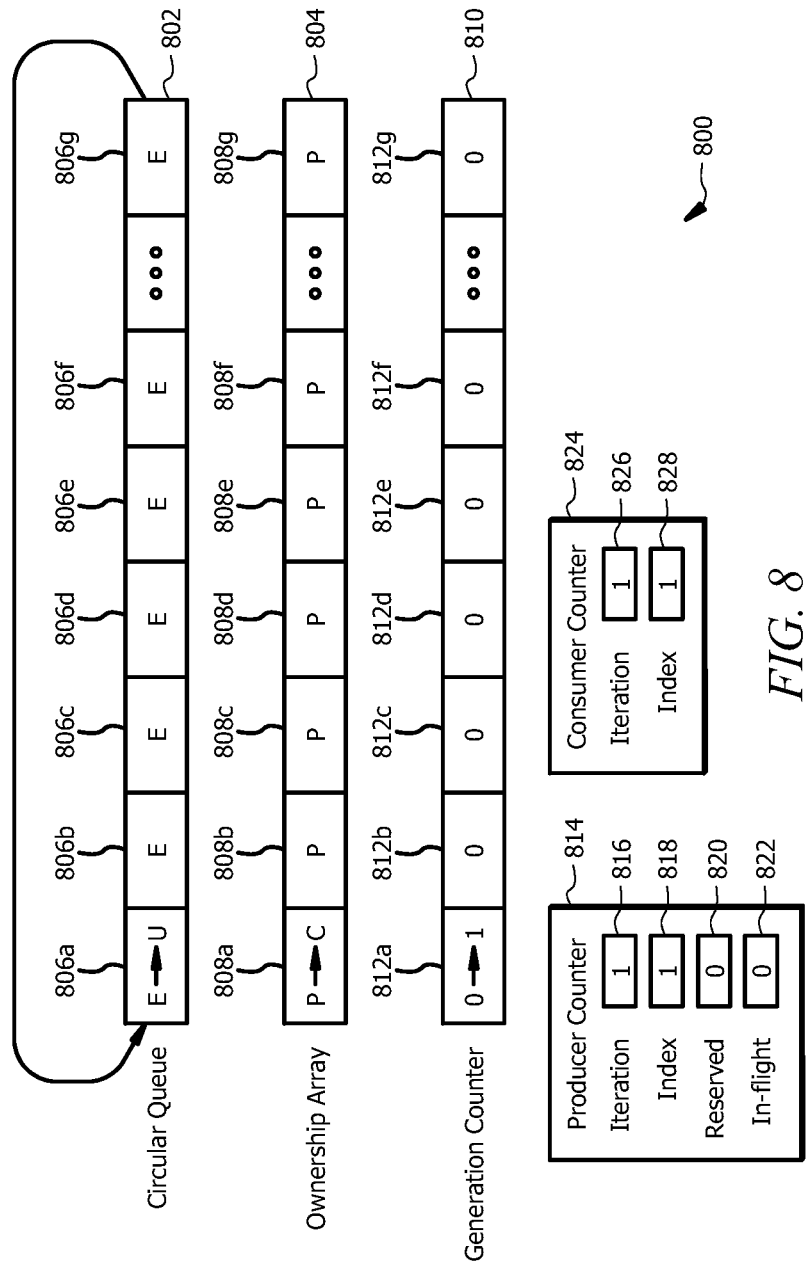
FIG. 8 illustrates an example of a circular queue, according to an illustrative embodiment of this disclosure.

FIG. 8 is a diagram 800 illustrating the implementation of an example circular queue 802. In general, the circular queue 802 is a memory buffer that is connected end-to-end, as described above. For example, a process consuming information from the circular queue 802 may proceed through segments 806*a-g* from left to right. Each segment 806*a-g* may correspond, for example, to a predefined memory block (e.g., a "page" of memory). In some embodiments, one or more of the segments 806*a-g* may correspond to a plurality of memory blocks or a subsection of memory (e.g., also referred to as a "chunk" in this disclosure with respect to FIGS. 13A-C and 14 below). Upon completion of writing to or reading from the final segment 806*g*, the process returns to the first segment 806*a* as indicated by the arrow in FIG. 8. In some embodiments, the circular queue 802 is associated with, or may include, an ownership array 804, a producer counter 814, and/or a consumer counter 824. The circular queue 802 is suitable for first-in, first out operations because it requires no data shuffling or copying, thereby reducing power consumption. The circular queue 802 may provide a reservation function and is wait-less, interrupt-safe, and lock-free, thereby providing a technical improvement over conventional technologies. The circular queue 802 may be configured as shown or in any equivalent configuration as appreciated by one of skill in the art. For example, one or both of the ownership array 804 and the generation number counter 810, may be implemented as separate arrays as shown or as information stored within the corresponding segments 806*a-g* of the circular queue 802 itself.

The circular queue 802 generally includes at least one memory segment 806*a-g*. For example, each of memory segments 806*a-g* may correspond to one or more pages or blocks of virtual memory. The segments 806*a-g* may be equally sized or of variable sizes. For example, if the queue 802 is to be used as a port buffer (e.g., such as port buffer 612) the segments 806*a-g* may be equally sized. In the illustrative example of FIG. 8, the circular queue 802 includes n segments 806*a-g*. Each segment 806*a-g* may store a message (e.g., such as message 308 of FIG. 3), a notification (e.g., such as notification packet 616 of FIG. 6), or any other information. In most embodiments, the circular queue 802 stores either messages or notifications. However, for illustrative purposes, the example of FIG. 8 is described with respect to writing and reading "entries." An entry may correspond to a message, a port notification, or any other appropriate data type which may be stored in the queue 802. Segments 806*a-g* of the circular queue 802 may be processed from left to right, and when the right-most entry is processed, the queue proceeds back to the beginning of the queue, as indicated by the arrow in FIG. 8.

The ownership array 804 generally provides information about which process(es) has/have permission to modify (e.g., read from, write to, over-write, etc.) the segments 806*a-g* of the circular queue 802. Both the kernel 108 and user space 102 can view the ownership array 804. For each of the n segments 806*a-g* of the circular queue 802, the ownership array 804 includes a corresponding ownership segment 808*a-g*, which is associated with the "ownership" of the segment 806*a-g* of the circular queue 802. Ownership may refer to whether a given segment may be read by a consumer process (e.g., a consumer process 304 or 604) or written to by a kernel (e.g., kernel 108) in response to a call from a producer process (e.g., a process 302 or 314). For example, each segment 808*a-g* of the ownership array 804 may store information regarding whether the corresponding queue segment 806*a-g* from queue 802 is currently owned by the kernel (e.g., kernel 108) or a consumer process (e.g., such as the consumer process 304 of FIG. 3). Thus, the consumer process will only read a message stored in the segment after the producer process has finished writing data to the corresponding segment of the circular queue 802. After the consumer process reads the message, the ownership array 804 may indicate that the associated segment of the circular queue 802 is owned by the producer process, such that the producer process only overwrites the memory of the segment after the consumer process has finished reading the content of the segment 806*a-g*. In some embodiments, the circular queue 802 is not associated with an ownership array 804 (e.g., a circular queue used for a port may not be associated with an ownership array).

As shown in the example of FIG. 8, each of segments 806*a-g* are initially owned by the producer process as designated by a "P" for producer process in each segment of the ownership array 804. Segment 806*a* of the queue 802 is undergoing a change of ownership in segment 808*a* from the producer to the consumer, as illustrated by the "P" designation changing to a "C" designation in the ownership array 804. This change of ownership may correspond, for example, to a message or notification having just been written to the segment 806*a* by the producer process, such that the message or notification is now ready to be consumed by the consumer process. This is illustrated by the transition from an empty state "E" to a used state "U" in segment 806*a* of the circular queue 802. The remaining segments 806*b-g* of the example circular queue 802 are empty and thus may be available for the producer to write a message. Accordingly, these segments 806*b-g* are owned by the producer, as indicated in segments 808*b-g*.

The generation counter 810 provides an indication of how many entries have been stored in segments 806*a-g* of the circular queue 802. The generation counter 810 may be stored as a separate array as shown in FIG. 8 or as part of the circular queue 802 (e.g., a portion of each segment 806*a-g* may be allocated to the corresponding segments 812*a-g* of the generation counter 810). The generation counter 810 has the same number of segments 812*a-g* as the number of segments 806*a-g* in the circular queue. For instance, information (e.g., in the form of a numerical value, as depicted in the example of FIG. 8) stored in the generation segments 812*a-g* of the generation counter 810 may correspond to the number of entries that have been written to the corresponding segments 806*a-g* of the circular queue. For example, as shown in FIG. 8, the value of the segment 812*a* of the generation counter 810 may be incremented from zero to one. Accordingly, the generation counter 810 may aid in ensuring that entries (e.g., messages and/or notifications) are enqueued and dequeued in an appropriate order and that entries are read before being over-written.

The producer counter 814 includes at least an iteration counter 816 and an index counter 818. The index counter 814 generally stores a value corresponding to the index number of the segment of the circular queue which is currently being accessed by a producer process. For example, the index of segments 806*a* through 806*g* may be 0 through n (where n is the total number of segments in the queue 802). The iteration counter generally stores a value corresponding to the current circular iteration around the circular queue 802 taken by the producer process. For example, during the first pass through the circular queue, the iteration value may be one, and this value may be incremented by one each time the producer processes wraps around the circular queue 802 (e.g., as illustrated by the arrow in FIG. 8).

In certain embodiments, the circular queue 802 is configured to allow reservations. In these embodiments, the producer counter includes a reservation counter 820 and an in-flight counter 822. In embodiments which facilitate reservations, the ownership array 804 may not be present or may not be used to determine whether permission is granted to enqueue and/or dequeue entries. The reservation counter 820 generally includes a value indicating a number of entries and/or segments of the queue 802 that have been reserved by a producer process and that are not currently associated with an in-flight entry. In some embodiments, the reservation counter 820 may further store (i.e., in addition to the reservation count) an identifier of the process that made the reservation and/or any other appropriate information. The reservation counter 820 facilitates more efficient communication (e.g., IPC) by allowing a consumer process to retain a stored message until the message is read or consumed. The in-flight counter 822 generally tracks entries that are currently being produced but that are not yet ready to be consumed by a consumer process and reserved entries that already have a produced entry that has not yet been consumed. Accordingly, the in-flight counter 822 generally provides information about whether entries (e.g., a message or notification) are currently being written to one or more of the segments 806*a-g* of the circular queue 802. Therefore, the in-flight counter 818 may aid in ensuring that another entry is not written to segment 806*b* when a message is already in the process of being written to the segment 806*b*.

The consumer counter 824 includes at least an iteration counter 826 and an index counter 828. The index counter 824 generally stores a value corresponding to the index number of the segment of the circular queue which is currently being accessed by a consumer process. For example, the index of segments 806*a* through 806*g* may be 0 through n (where n is the total number of segments in the queue 802). The iteration counter generally stores a value corresponding to the current circular iteration around the circular queue 802 of the consumer process.

Figure 9:
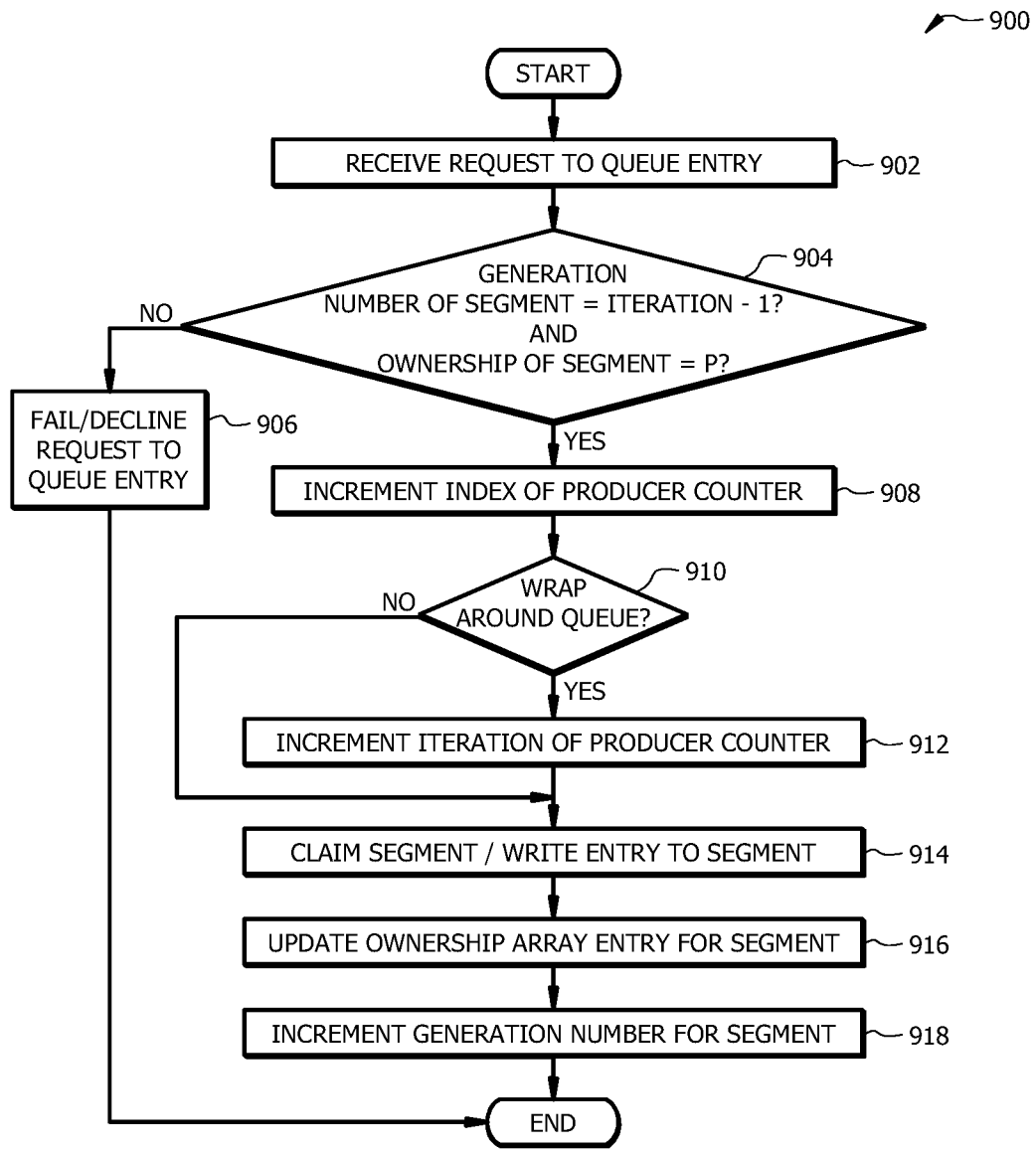
FIGS. 9-12 illustrate example methods for operating a circular queue, according to an illustrative embodiment of this disclosure.
Figure 10:
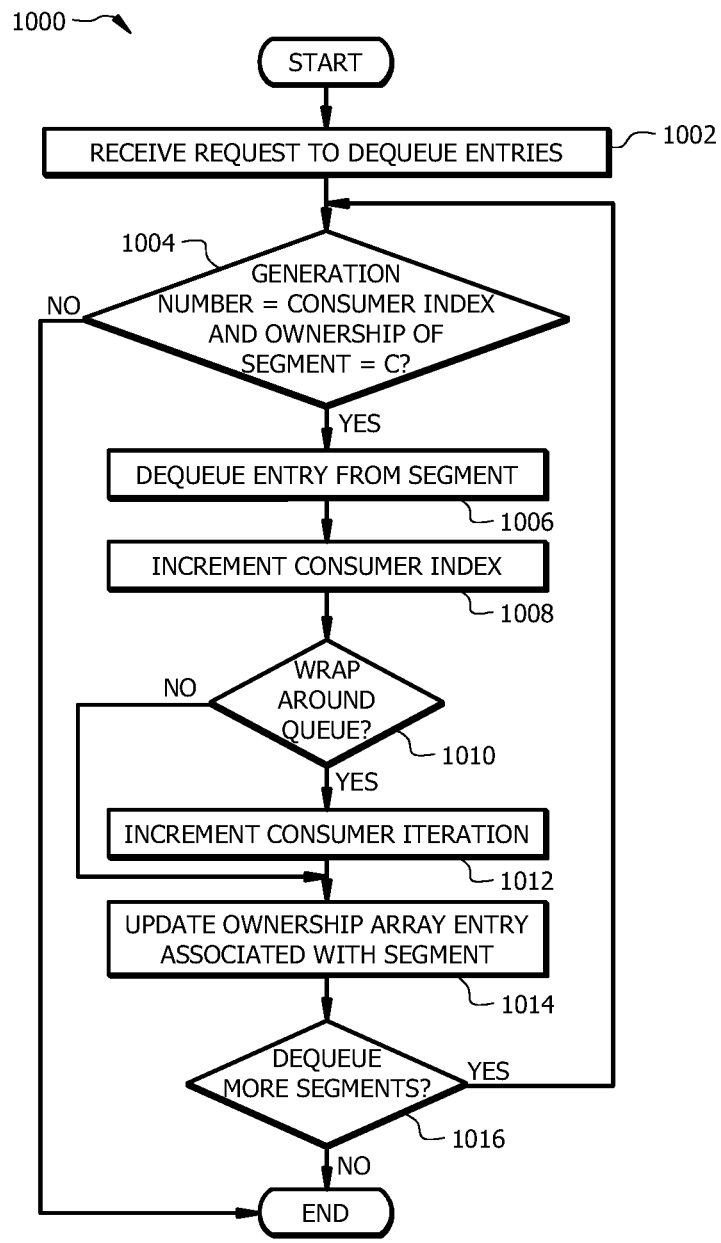
Figure 11:
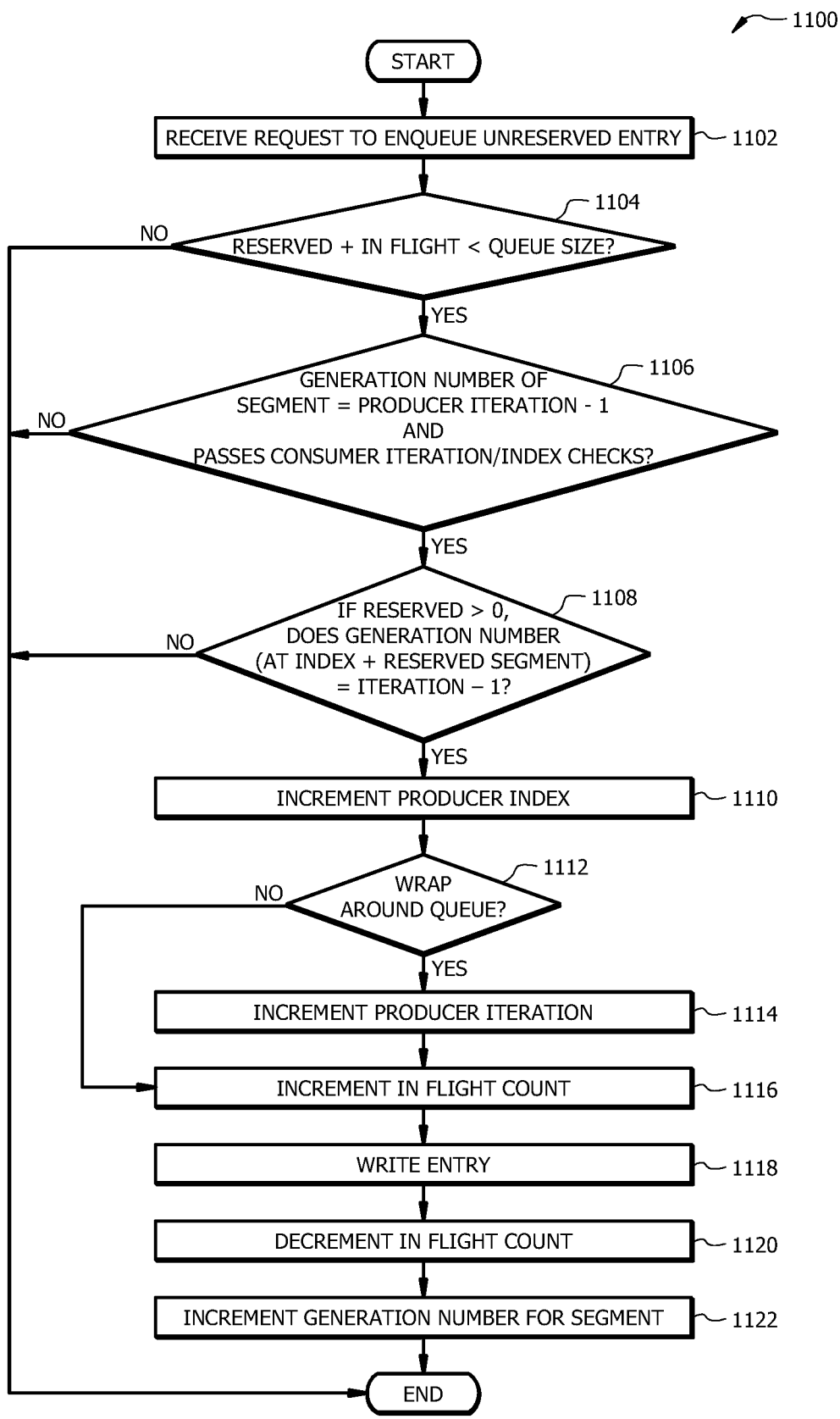
Figure 12:
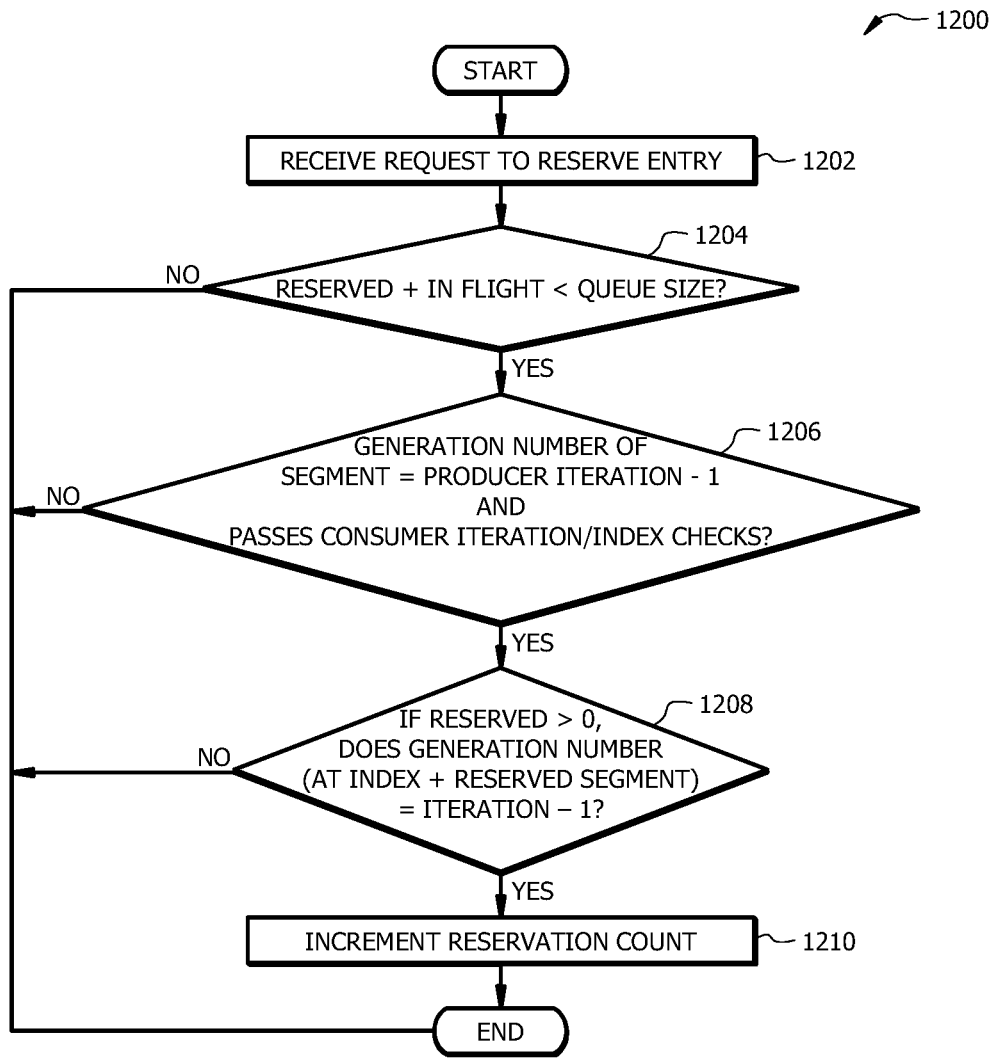

Example operation of the circular queue 802 is described with respect to FIGS. 9-12 in the following. FIGS. 9 and 10 illustrate examples of enqueueing and dequeuing entries, respectively, in a circular queue. The example methods 900 and 1000 of FIGS. 9 and 10 may be implemented with the circular queue 802 with an associated ownership array 804, generation counter 810, producer counter 814, and consumer counter 824, where the producer counter 814 includes the iteration counter 816 and index counter 818 (and not necessarily the reservation counter 820 and in-flight counter 822). FIGS. 11 and 12 illustrate operation of circular queue configured for accepting reservations. For instance, the example methods 11000 and 1200 of FIGS. 11 and 12 may be implemented with the circular queue 802 with an associated generation counter 810, producer counter 814, and consumer counter 824, where the producer counter 814 includes each of the iteration counter 816, index counter 818, reservation counter 820, and in-flight counter 822. The example methods 11000 and 1200 of FIGS. 11 and 12 generally do not require ownership array 804.

FIG. 9 illustrates an example method 900 for writing a message to a circular queue, such as the circular queue 802 of FIG. 8. Method 900 may for example be implementing using the circular buffer 802 of FIG. 8 when configured without a reservation function (e.g., where the queue has an associated ownership array and the consumer counter 814 does not include a reservation counter 820 and an in-flight counter 822). Such a circular queue may be, for example, used for an IPC channel (e.g., IPC channel 330 of FIG. 3). The method may begin at step 902, where a request is received to enqueue an entry in the circular queue. For example, the request may be received by a kernel of a computing device's operating system (e.g., by kernel 108) to communicate from a producer process (e.g., a first process) to a consumer process (e.g., a second process) using a circular queue (e.g., circular queue 802). For example, the producer process (e.g., producer process 302, 314 or 602) may send a system call to the kernel requesting to write a message to the circular queue for communication to the consumer process (e.g., consumer process 304 or 604).

At step 904, the producer process determines whether a set of criteria are met to receive permission to write the entry to the buffer. The criteria include whether (1) the generation number of the segment (e.g., the generation number from generation counter 810 of FIG. 8) being written to is equal to the iteration number for the producer process (e.g., the iteration number from the iteration counter 816 of producer counter 814) minus one and (2) whether the segment is owned by the producer process (e.g., based on an entry in an ownership array, such as the ownership array 804 of FIG. 8). For example, as described with respect to FIG. 8, an ownership array 804 generally includes ownership segments 808a-g, where the number of ownership segments 808a-g is the same as the number of segments 806a-g of the circular queue 802. If a segment is not owned by the producer process and the generation number is not equal to the producer iteration minus one, the request to enqueue the entry is failed, and the method 900 may be ended. In general, entries must be produced sequentially, and a producer process cannot store an entry in a subsequent segment of the buffer once the criteria described above are found to not be satisfied.

If the criteria are satisfied at step 904, the method proceeds to step 908. At step 908, the value of the producer index is incremented by one. For example, the value stored in the producer index counter 818 of FIG. 8 may be incremented to direct the producer process to the next segment of the queue 802. At steps 910 and 912, if moving to next segment of the queue causes the process to wrap around the queue (e.g., from the final segment 806g to the first segment 806a of FIG. 8), the value of the iteration counter 816 is also incremented by one. For example, to ensure lockless behavior, an atomic compare and swap instructions may be executed to claim the segment at step 914. If the compare and swap instruction is successful steps 908, 910, and 912 are performed in combination, and the segment is claimed. At step 914, the producer process claims the segment and may write the entry to the segment. At step 916, the ownership array is updated to indicate that the segment is now owned by the consumer process (e.g., as depicted in segment 808a of FIG. 8). At step 918, the generation count for the segment is incremented by one (e.g., as depicted in segment 812a of the generation counter 810 of FIG. 8). Method 900 may be repeated to enqueue one or more additional entries in the circular queue Particular embodiments may repeat one or more steps of the method of FIG. 9, where appropriate. Although this disclosure describes and illustrates particular steps of the method of FIG. 9 as occurring in a particular order, this disclosure contemplates any suitable steps of the method of FIG. 9 occurring in any suitable order. Moreover, although this disclosure describes and illustrates an example method for operating a circular queue including the particular steps of the method of FIG. 9, this disclosure contemplates any suitable method for operating a circular queue including any suitable steps, which may include all, some, or none of the steps of the method of FIG. 9, where appropriate. Furthermore, although this disclosure describes and illustrates particular components, devices, or systems carrying out particular steps of the method of FIG. 9, this disclosure contemplates any suitable combination of any suitable components, devices, or systems carrying out any suitable steps of the method of FIG. 9.

FIG. 10 illustrates an example method 1000 of dequeuing (e.g., consuming) an entry stored in a circular buffer (e.g., the circular buffer 802 of FIG. 8). As described above, the method 1000 may be performed using the circular queue 802 of FIG. 8 with an associated ownership array 804. The method 1000 may begin at step 1002, where a request is received (e.g., from a consumer process) to dequeue and/or consume entries (e.g., messages or notifications) stored in the circular buffer. At step 1004, the consumer process determines whether a set of criteria are met for dequeuing an entry from the current segment. The generation number of the current segment (e.g., from the generation count 810) is compared to the consumer index value (e.g., from the index counter 828 of the consumer counter 824) and the ownership of the segment is determined (e.g., based on the value in the ownership array 804 for the segment). The criteria are determined to be satisfied (1) if the generation number is equal to the value of the consumer index and (2) the ownership of the segment indicates the consumer owns the segment.

If the criteria are satisfied at step 1004, the method 1000 proceeds to step 1006. At step 10006, the consumer process dequeues the entry. For example, the process may read or consume the entry. At step 1008, the consumer index (e.g., the value of the index counter 828 of FIG. 8) may be incremented (e.g., to indicate that the consumer has proceeded to the next segment of the circular queue). At steps 1010 and 1012, if incrementing the index corresponds to wrapping around the circular queue (at step 1010), the consumer iteration value (e.g., in iteration counter 826 of FIG. 8) is also incremented (e.g., to indicate that the consumer process has completed an iteration of the circular queue). For a circular queue that is not configured for reservations (e.g., as described in greater detail below), the consumer iteration may be incremented at step 1012 before the entry is dequeued from the segment at step 1006. For example, to ensure lockless behavior, an atomic compare and swap instructions may be executed to dequeue the entry at step 1006. If the compare and swap instruction is successful steps 1008, 1010, and 1012 are performed in combination, and the entry is dequeued. Otherwise, the operation may be failed. This may prevent an entry from being dequeued if the criteria evaluated at step 1004 are no longer satisfied before subsequent steps of method 1000 are performed. At step 1014, the entry in the ownership array (e.g., in ownership array 804 of FIG. 8) is updated to indicate that the corresponding segment of the queue is now owned by the producer process. In some cases, after an entry is read from the segment, the consumer process may try to dequeue another entry at the current segment index (e.g., the segment identified by index 828 of FIG. 8). At step 1016, the consumer process determines whether to attempt to dequeue additional segments. For example, the consumer process may determine whether each segment or entry associated with the request at step 1002 was checked. If the process is attempting to dequeue an additional segment at step 1016, the consumer process proceeds to the next segment and returns to step 1004 to determine whether the next segment satisfies the criteria described above. Once the process no longer attempts to dequeue segments at step 1016, the method 1000 ends.

Particular embodiments may repeat one or more steps of the method of FIG. 10, where appropriate. Although this disclosure describes and illustrates particular steps of the method of FIG. 10 as occurring in a particular order, this disclosure contemplates any suitable steps of the method of FIG. 10 occurring in any suitable order. Moreover, although this disclosure describes and illustrates an example method for operating a circular queue including the particular steps of the method of FIG. 10, this disclosure contemplates any suitable method for operating a circular queue including any suitable steps, which may include all, some, or none of the steps of the method of FIG. 10, where appropriate. Furthermore, although this disclosure describes and illustrates particular components, devices, or systems carrying out particular steps of the method of FIG. 10, this disclosure contemplates any suitable combination of any suitable components, devices, or systems carrying out any suitable steps of the method of FIG. 10.

FIG. 11 illustrates an example method 1100 of enqueuing an unreserved entry in a circular buffer configured to allow reservations. For instance, a reservation-enabled circular queue may be used as a port (e.g., port 640 of FIG. 6). As described above, a reservation-enabled circular queue may correspond to the circular queue 802 of FIG. 8 where the producer counter 814 includes each of the iteration counter 816, index counter 818, reservation counter 820, and in-flight counter 822. The example method 1100 of FIG. 11 generally does not require the ownership array 804 of FIG. 8.

Method 1100 may start at step 1102 where a request to enqueue an unreserved entry is received. At step 1104, the producer process determines whether the sum of the reservation number (e.g., the value of the reservation counter 820 of FIG. 8) and the value of the in-flight number (e.g., the value of the in-flight counter 822 of FIG. 8) is less than the size of the circular queue (e.g., less than the number of segments 806a-g in the circular queue 802 of FIG. 8). If this criteria is not satisfied at step 1104, the request is denied, and method 1100 generally ends. If the criteria is satisfied at step 1104, the method 1100 proceeds to step 1106.

At step 1106, the producer process determines whether further criteria are satisfied prior to enqueuing the entry in the unreserved segment. For example, as shown in FIG. 11, the producer process may determine (1) whether the generation number of the segment (e.g., the generation number from generation counter 810 of FIG. 8) being written to is equal to the iteration number for the producer process (e.g., the iteration number from the iteration counter 816 of producer counter 814 of FIG. 8) minus one and (2) whether segment passes a consumer iteration/index check. The consumer iteration/index check generally includes a determination of whether at least one of two consumer-check criteria are satisfied. The first consumer-check criteria may be a determination of whether the generation count at the producer index (e.g., the value in the generation counter 810 at the segment corresponding to the value in the index counter 818 of FIG. 8) is equal to the consumer iteration value (e.g., the value of the consumer iteration counter 826 of FIG. 8) minus one. The second consumer-check criteria may be a determination of whether both: (1) the generation count at the consumer index (e.g., the value in the generation counter 810 at the segment corresponding to the value in the index counter 818 of FIG. 8) is equal to the consumer iteration value (e.g., the value of the consumer iteration counter 826 of FIG. 8) and (2) the consumer index (e.g., the value of the consumer index counter 828) is greater than the producer index (e.g., the value of the producer index 818). If both of criteria (1) and (2) are satisfied, the second consumer-check criteria are satisfied. If the criteria at step 1106 are not satisfied, the request is denied and method 1100 generally ends. If the criteria are satisfied at step 1106, the method 1100 proceeds to step 1108.

At step 1108, if the reservation count is greater than zero (e.g., if the value of the reservation counter 820 of FIG. 8 is greater than zero), the producer process determines whether further criteria are satisfied before the entry is approved for enqueue. For instance, the criteria may require that the generation number of the segment at the index number plus the reservation count is equal to the producer iteration value minus one. For example, if the reservation number is two (e.g., according to the value of the reservation counter 820 of FIG. 8), the producer process may determine whether the generation number of the segment at the current index value plus the reservation number is equal to the value of the producer iteration (e.g., in the iteration counter 816 of FIG. 8) minus one. If this criteria is satisfied, the enqueue request is approved, and the method 1100 proceeds to step 1110. Otherwise, if the criteria is not satisfied, method 1100 ends.

At step 1110, the producer index value is incremented by one. For instance, the value of the index counter 818 of FIG. 8 may be increased by one. At steps 1112 and 1114, if incrementing the producer counter causes the process to wrap around the queue (e.g., from the final segment 806g to the first segment 806a of FIG. 8), the value of the producer iteration counter is also incremented by one. At step 1116, the in-flight counter value is incremented by one, indicating the entry is being stored in the queue or is otherwise in-flight to the queue. For example, the value of the in-flight counter 822 of FIG. may be increased by one. For example, to ensure lockless behavior, an atomic compare and swap instructions may be executed to claim the entry at step 1118. If the compare and swap instruction is successful steps 1110, 1112, 1114, and 1116 are performed in combination, and the entry is claimed. At step 1118, the entry is written to the segment of the circular queue. At step 1120, after the entry is written to the segment, the value of the in-flight counter is decreased by one. At step 1122, the value of the generation counter is increased by one. For example, the value of the segment of the generation counter 810 that corresponds to the segment of the written entry may be incremented by one. The method 1100 may be repeated to enqueue one or more additional entries in the circular queue.

Particular embodiments may repeat one or more steps of the method of FIG. 11, where appropriate. Although this disclosure describes and illustrates particular steps of the method of FIG. 11 as occurring in a particular order, this disclosure contemplates any suitable steps of the method of FIG. 11 occurring in any suitable order. Moreover, although this disclosure describes and illustrates an example method for operating a circular queue including the particular steps of the method of FIG. 11, this disclosure contemplates any suitable method for operating a circular queue including any suitable steps, which may include all, some, or none of the steps of the method of FIG. 11, where appropriate. Furthermore, although this disclosure describes and illustrates particular components, devices, or systems carrying out particular steps of the method of FIG. 11, this disclosure contemplates any suitable combination of any suitable components, devices, or systems carrying out any suitable steps of the method of FIG. 11.

FIG. 12 illustrates an example method 1200 of reserving an entry in a circular buffer configured to allow reservations. Examples of a reservation-enabled circular queue are described above (e.g., with respect to FIGS. 8 and 11). Method 1200 may start at step 1202 where a request to reserve an entry is received. At step 1204, the producer process determines whether the sum of the value of the reservation number (e.g., the value of the reservation counter 820 of FIG. 8) and the value of the in-flight number (e.g., the value of the in-flight counter 822 of FIG. 8) is less than the size of the circular queue (e.g., less than the number of segments 806a-g in the circular queue 802 of FIG. 8). If this criteria is not satisfied at step 1204, the request is denied and method 1200 ends. If the criteria is satisfied at step 1204, the method 1200 proceeds to step 1206.

At step 1206, the producer process determines whether additional criteria are satisfied prior to reserving the entry. For example, the producer process may determine both: (1) whether the generation number of the segment (e.g., the generation number from generation counter 810 of FIG. 8) being written to is equal to the iteration number for the producer process (e.g., the iteration number from the iteration counter 816 of producer counter 814 of FIG. 8) minus one and (2) whether segment passes a consumer iteration/index check. The consumer iteration/index check generally includes a determination of whether one of two consumer-check criteria are satisfied. The first consumer-check criteria may be a determination of whether the generation count at the producer index (e.g., the value in the generation counter 810 at the segment corresponding to the value in the index counter 818 of FIG. 8) is equal to the consumer iteration value (e.g., the value of the consumer iteration counter 826 of FIG. 8) minus one. The second consumer-check criteria may be a determination of whether both (1) the generation count at the consumer index (e.g., the value in the generation counter 810 at the segment corresponding to the value in the index counter 818 of FIG. 8) is equal to the consumer iteration value e.g., the value of the consumer iteration counter 826 of FIG. 8) and (2) the consumer index (e.g., the value of the consumer index counter 828) is greater than the producer index (e.g., the value of the producer index 818). If both of criteria (1) and (2) are satisfied, the second consumer-check criteria is satisfied. If the criteria at step 1206 are not satisfied, the request is denied, and method 1200 generally ends. If the criteria are satisfied at step 1206, the method 1200 proceeds to step 1208.

At step 1208, if the reservation count is greater than zero (e.g., if the value of the reservation counter 820 of FIG. 8 is greater than zero), the producer process may determine whether further criteria are satisfied before the entry is approved for reservation. For instance, the criteria may require that the generation number of the segment at the index number plus the reservation count is equal to the producer iteration value minus one. For example, if the reservation number is two (e.g., according to the value of the reservation counter 820 of FIG. 8), the process may determine whether the generation number of the segment at the current index value plus the reservation number is equal to the value of the producer iteration (e.g., in the iteration counter 816 of FIG. 8) minus one. If this criteria is satisfied, the reservation request is approved, and the method 1200 proceeds to step 1210. At step 1210, the value of the reservation counter is incremented by one (e.g., the value of the reservation counter 820 of FIG. 8 is incremented by one) to reserve the entry. For example, an atomic compare and swap instruction may be executed to reserve the entry. If the instruction is successful, the entry may be reserved. Generally, when a reserved in entry is consumed, the reservation counter is decremented by one.

Particular embodiments may repeat one or more steps of the method of FIG. 12, where appropriate. Although this disclosure describes and illustrates particular steps of the method of FIG. 12 as occurring in a particular order, this disclosure contemplates any suitable steps of the method of FIG. 12 occurring in any suitable order. Moreover, although this disclosure describes and illustrates an example method for operating a circular queue including the particular steps of the method of FIG. 12, this disclosure contemplates any suitable method for operating a circular queue including any suitable steps, which may include all, some, or none of the steps of the method of FIG. 12, where appropriate. Furthermore, although this disclosure describes and illustrates particular components, devices, or systems carrying out particular steps of the method of FIG. 12, this disclosure contemplates any suitable combination of any suitable components, devices, or systems carrying out any suitable steps of the method of FIG. 12. While certain embodiments of the systems and methods described above are described with respect to implementation in a microkernel operating system, it should be understood that the systems and methods may be employed in a monolithic kernel operating system.

Message Buffer Management

In some cases, a circular queue or buffer, such as the circular queue 802 of FIG. 8, may need to store variably sized entries (e.g., messages with variable sizes). However, keeping account of memory availability using conventional approaches is generally inefficient in terms of the use of processing resources and power. This disclosure contemplates a unique approach to tracking memory usage in a memory buffer by segmenting a circular memory buffer into predefined coarse chunks (i.e., subsections of the memory buffer). A chunk may include one or more segments of memory. The available memory space in the buffer is divided into two or more chunks, and each chunk is associated with a counter that tracks the number of messages residing within that chunk. When a new message is received, its size is determined, the chunk in which the end of the message would be located is identified for if the message was added from the current memory offset. The message is only written to the chunk(s) if the current count of each chunk other than the first chunk is zero. For instance, if a message is written from a start position that is different from the start position of the first chunk containing the message, the first chunk containing the message does not need to be empty. This helps ensure, with the expenditure of fewer overhead resources than was possible using previous approaches, that messages of variable sizes do not overwrite each other.

Figure 13A:
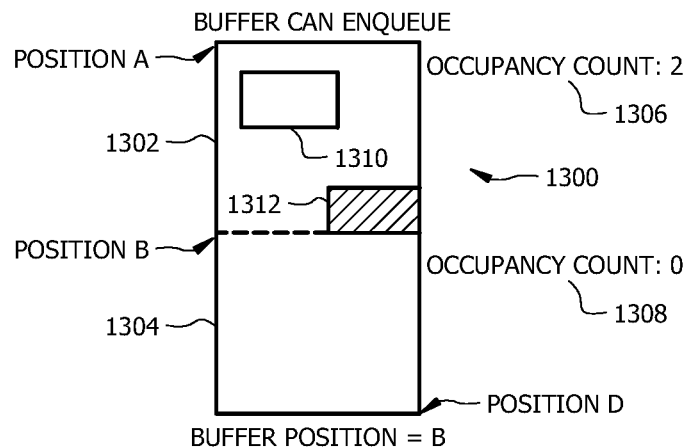
FIGS. 13A-C illustrate an example of a circular memory buffer, according to an illustrative embodiment of this disclosure.
Figure 13B:
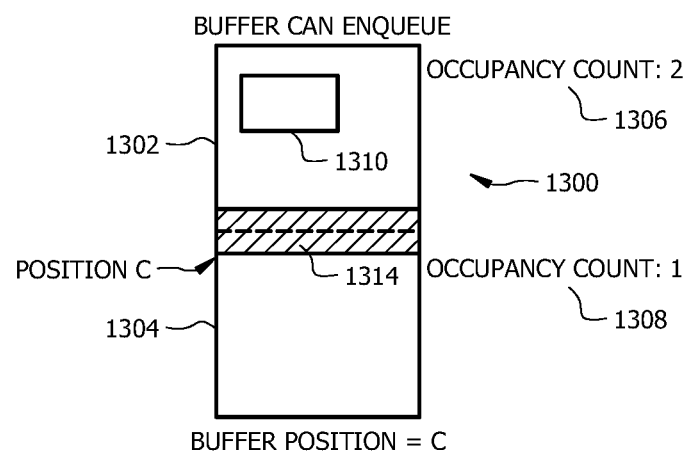
Figure 13C:
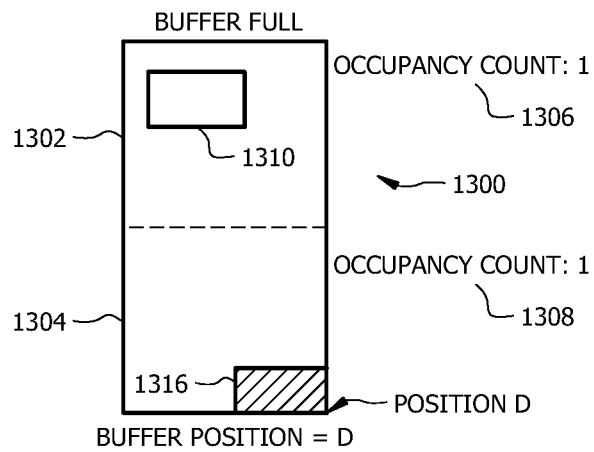

FIGS. 13A-C illustrate a circular memory buffer 1300 that is divided into two memory chunks 1302 and 1304. The first chunk 1302 and the second chunk 1304 may be the same size (i.e., equally sized) or different sizes. The first chunk 1302 generally extends from position A to position B of the circular memory buffer 1300, while the second chunk 1304 extends from position B to position D of the circular memory buffer 1300, as illustrated in FIGS. 13A-C. Each of chunks 1302 and 1304 is associated with a corresponding message-occupancy indicator 1306 and 1308, respectively. The message-occupancy indicators 1306 and 1308 may store a value indicative of a number of messages stored in the corresponding chunks 1302 and 1304, respectively. In some embodiments, a secondary (e.g., supplemental) buffer may be associated with the buffer 1300 and used to store additional messages, for example, which may exceed a size threshold of the original buffer 1300. In some embodiments, the buffer 1300 may be configured to describe information stored in the larger secondary buffer (e.g., buffer 1300 may act as a header of the secondary buffer).

As shown in the example of FIG. 13A, the first chunk 1302 contains two messages, message 1310 and message 1312. The message occupancy indicator 1306 for chunk 1302 has a count of two. Meanwhile chunk 1304 contains zero messages, corresponding to message-occupancy indicator 1308 having a count of zero. In the example of FIG. 13A, the circular memory buffer 1300 is generally available to enqueue (e.g., store) an additional message, as long as the end point of the additional message does not extend beyond position D of the memory buffer 1300.

FIG. 13B shows the memory buffer 1300 storing the message 1310 and a message 1314. Message 1314 is stored in both the first chunk 1302 and the second chunk 1304. Message 1314 has an end position corresponding to Position C in the second chunk 1304 of the buffer 1300. Consequently, the occupancy indicator 1306 of the first chunk 1302 has a count of two, and the occupancy indicator 1308 of the second chunk 1304 has a count of one. In the example of FIG. 13B, the memory buffer 1300 is generally available to enqueue (e.g., store) an additional message, as long as the end point of the additional message does not extend beyond position D of the memory buffer 1300 (i.e., as long as the added message "fits" between positions C and D of the buffer 1300).

FIG. 13C shows the memory buffer 1300 storing the message 1310 in chunk 1302 and a message 1316 in chunk 1304. Consequently, the occupancy indicator 1306 of the first chunk 1302 has a count of one, and the occupancy indicator 1308 of the second chunk 1304 has a count of one. The end position of the message 1316 corresponds to the end position D of the memory buffer 1300. In the example of FIG. 13C, the memory buffer 1300 is generally not available to enqueue (e.g., store) an additional message, because the additional message would have an end position that extends into the next chunk (i.e., extends at least into the first chunk 1302), which has an occupancy count that is greater than zero.

Figure 14:
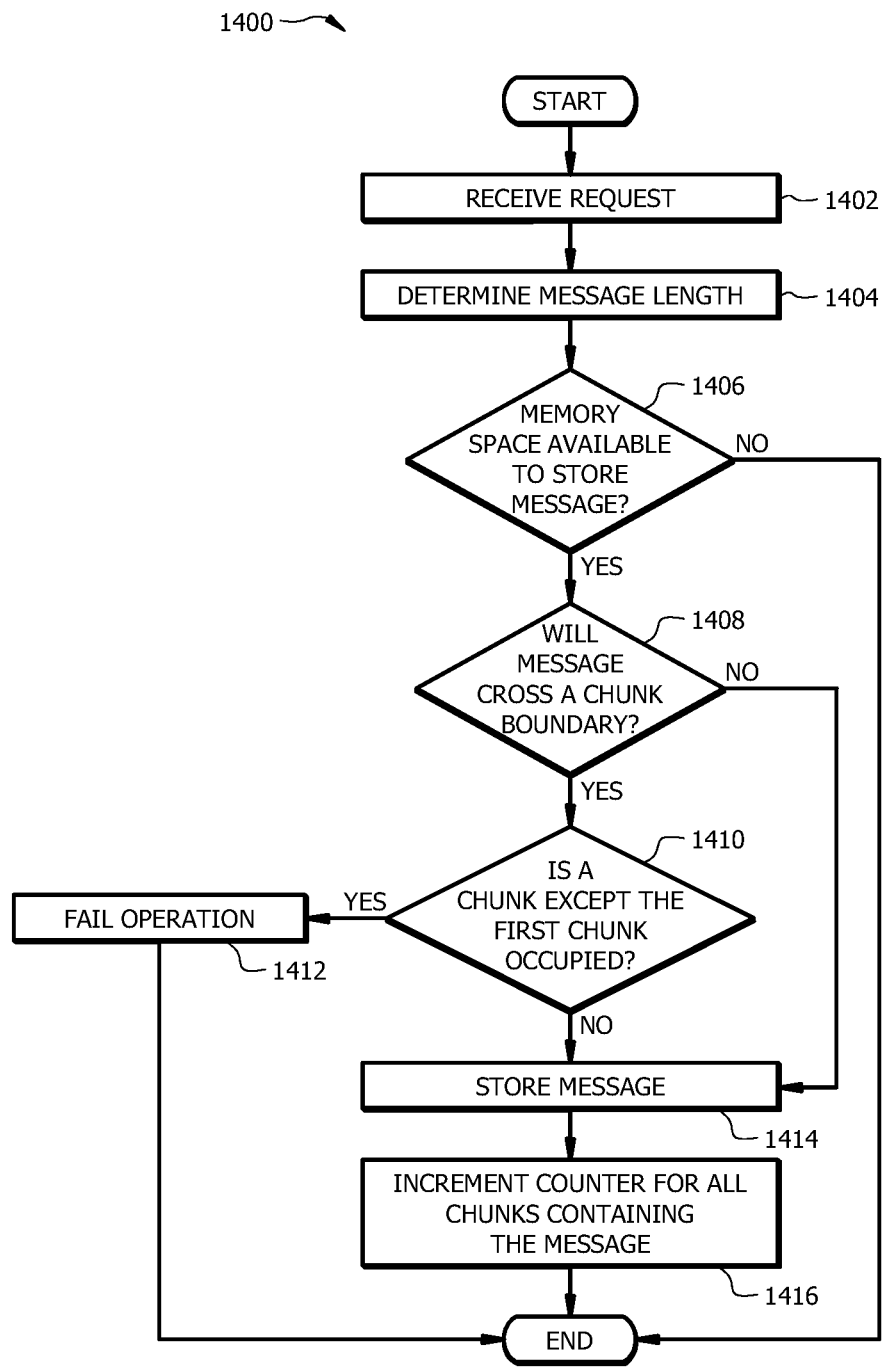
FIG. 14 illustrates a method for managing a circular memory buffer, according to an illustrative embodiment of this disclosure.

FIG. 14 illustrates an example method 1400 for storing a message in a memory buffer (e.g., such as circular memory buffer 1300 of FIGS. 13A-C). The method 1400 may begin at step 1402, where a request is received to store a message in the memory buffer. At step 1404, a producer process may determine a start and stop position of the message when stored in the message buffer. At step 1406, the kernel may determine if the memory buffer has sufficient space (e.g., based on the determined start and stop positions of the message) to store the message. If the buffer has insufficient space for the message, the method ends, and the message is not stored. Otherwise, the method 1400 proceeds to step 1408.

At step 1408, the kernel determines, based on the start and end positions, whether the message, when stored, will occupy more than one chunk of the memory buffer. In other words, the kernel determines if the message will cross boundaries between chunks (e.g., the boundary between chunks 1302 and 1304 at position B of FIGS. 13A-C) or the boundary at position D. If the message will not occupy more than one chunk of the memory buffer (as determined at step 1408), the method proceeds to step 1414 to store the message, as described below. If the message will occupy more than one chunk of the memory buffer, the method proceeds to step 1410. At step 1410, the kernel determines if each chunk that will contain the message when written other than the first chunk is occupied. Generally, the first chunk may store information (e.g., a previously stored message), as long as the start position for the to-be-written message does not coincide with the start position of the respective chunk without requiring to check whether the chunk is occupied. If the start position of the message corresponds to the start position of a chunk, the respective chunk must not be occupied as well. If any of the chunks that need to be checked are occupied, the request to store the message is denied at step 1412, and the method 1400 ends. If the chunks are unoccupied, the message is stored at step 1414.

At step 1414, the message is stored (e.g., written) to the memory buffer. The message may be associated with a header that includes an indication of the start and end positions of the message. For instance, the header may be an entry in a circular queue associated with the memory buffer. At step 1416, the message-occupancy indicator for each chunk containing the stored message is updated. For example, the value of the indicator may be incremented by one for each chunk that contains at least a portion of the message.

Particular embodiments may repeat one or more steps of the method of FIG. 14, where appropriate. Although this disclosure describes and illustrates particular steps of the method of FIG. 14 as occurring in a particular order, this disclosure contemplates any suitable steps of the method of FIG. 14 occurring in any suitable order. Moreover, although this disclosure describes and illustrates an example method for storing a message in a memory buffer including the particular steps of the method of FIG. 14, this disclosure contemplates any suitable method for storing a message in a memory buffer including any suitable steps, which may include all, some, or none of the steps of the method of FIG. 14, where appropriate. Furthermore, although this disclosure describes and illustrates particular components, devices, or systems carrying out particular steps of the method of FIG. 14, this disclosure contemplates any suitable combination of any suitable components, devices, or systems carrying out any suitable steps of the method of FIG. 14. While certain embodiments of the systems and methods described above are described with respect to implementation in a microkernel operating system, it should be understood that the systems and methods may be employed in a monolithic kernel operating system.

Example Computing System

Figure 15:
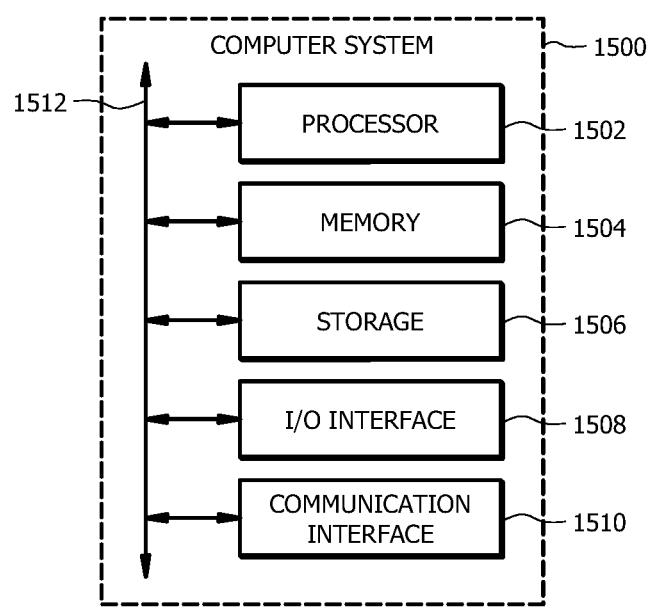
FIG. 15 illustrates an example computer system for use in any of the embodiments described in this disclosure.

FIG. 15 illustrates an example computer system 1500. In particular embodiments, one or more computer systems 1500 perform one or more steps of one or more methods described or illustrated herein. In particular embodiments, one or more computer systems 1500 provide functionality described or illustrated herein. In particular embodiments, software running on one or more computer systems 1500 performs one or more steps of one or more methods described or illustrated herein or provides functionality described or illustrated herein. Particular embodiments include one or more portions of one or more computer systems 1500. Herein, reference to a computer system may encompass a computing device, and vice versa, where appropriate. Moreover, reference to a computer system may encompass one or more computer systems, where appropriate.

This disclosure contemplates any suitable number of computer systems 1500. This disclosure contemplates computer system 1500 taking any suitable physical form. As example and not by way of limitation, computer system 1500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1500 may include one or more computer systems 1500; be unitary or distributed; span multiple locations; span multiple machines; span multiple data centers; or reside in a cloud, which may include one or more cloud components in one or more networks. Where appropriate, one or more computer systems 1500 may perform without substantial spatial or temporal limitation one or more steps of one or more methods described or illustrated herein. As an example and not by way of limitation, one or more computer systems 1500 may perform in real time or in batch mode one or more steps of one or more methods described or illustrated herein. One or more computer systems 1500 may perform at different times or at different locations one or more steps of one or more methods described or illustrated herein, where appropriate.

In particular embodiments, computer system 1500 includes a processor 1502, memory 1504, storage 1506, an input/output (I/O) interface 1508, a communication interface 1510, and a bus 1512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1502 includes hardware for executing instructions, such as those making up a computer program. As an example and not by way of limitation, to execute instructions, processor 1502 may retrieve (or fetch) the instructions from an internal register, an internal cache, memory 1504, or storage 1506; decode and execute them; and then write one or more results to an internal register, an internal cache, memory 1504, or storage 1506. In particular embodiments, processor 1502 may include one or more internal caches for data, instructions, or addresses. This disclosure contemplates processor 1502 including any suitable number of any suitable internal caches, where appropriate. As an example and not by way of limitation, processor 1502 may include one or more instruction caches, one or more data caches, and one or more translation lookaside buffers (TLBs). Instructions in the instruction caches may be copies of instructions in memory 1504 or storage 1506, and the instruction caches may speed up retrieval of those instructions by processor 1502. Data in the data caches may be copies of data in memory 1504 or storage 1506 for instructions executing at processor 1502 to operate on; the results of previous instructions executed at processor 1502 for access by subsequent instructions executing at processor 1502 or for writing to memory 1504 or storage 1506; or other suitable data. The data caches may speed up read or write operations by processor 1502. The TLBs may speed up virtual-address translation for processor 1502. In particular embodiments, processor 1502 may include one or more internal registers for data, instructions, or addresses. This disclosure contemplates processor 1502 including any suitable number of any suitable internal registers, where appropriate. Where appropriate, processor 1502 may include one or more arithmetic logic units (ALUs); be a multi-core processor; or include one or more processors 1502. Although this disclosure describes and illustrates a particular processor, this disclosure contemplates any suitable processor.

In particular embodiments, memory 1504 includes main memory for storing instructions for processor 1502 to execute or data for processor 1502 to operate on. As an example and not by way of limitation, computer system 1500 may load instructions from storage 1506 or another source (such as, for example, another computer system 1500) to memory 1504. Processor 1502 may then load the instructions from memory 1504 to an internal register or internal cache. To execute the instructions, processor 1502 may retrieve the instructions from the internal register or internal cache and decode them. During or after execution of the instructions, processor 1502 may write one or more results (which may be intermediate or final results) to the internal register or internal cache. Processor 1502 may then write one or more of those results to memory 1504. In particular embodiments, processor 1502 executes only instructions in one or more internal registers or internal caches or in memory 1504 (as opposed to storage 1506 or elsewhere) and operates only on data in one or more internal registers or internal caches or in memory 1504 (as opposed to storage 1506 or elsewhere). One or more memory buses (which may each include an address bus and a data bus) may couple processor 1502 to memory 1504. Bus 1512 may include one or more memory buses, as described below. In particular embodiments, one or more memory management units (MMUs) reside between processor 1502 and memory 1504 and facilitate accesses to memory 1504 requested by processor 1502. In particular embodiments, memory 1504 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1504 may include one or more memories 1504, where appropriate. Although this disclosure describes and illustrates particular memory, this disclosure contemplates any suitable memory.

In particular embodiments, storage 1506 includes mass storage for data or instructions. As an example and not by way of limitation, storage 1506 may include a hard disk drive (HDD), a floppy disk drive, flash memory, an optical disc, a magneto-optical disc, magnetic tape, or a Universal Serial Bus (USB) drive or a combination of two or more of these. Storage 1506 may include removable or non-removable (or fixed) media, where appropriate. Storage 1506 may be internal or external to computer system 1500, where appropriate. In particular embodiments, storage 1506 is non-volatile, solid-state memory. In particular embodiments, storage 1506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1506 taking any suitable physical form. Storage 1506 may include one or more storage control units facilitating communication between processor 1502 and storage 1506, where appropriate. Where appropriate, storage 1506 may include one or more storages 1506. Although this disclosure describes and illustrates particular storage, this disclosure contemplates any suitable storage.

In particular embodiments, I/O interface 1508 includes hardware, software, or both, providing one or more interfaces for communication between computer system 1500 and one or more I/O devices. Computer system 1500 may include one or more of these I/O devices, where appropriate. One or more of these I/O devices may enable communication between a person and computer system 1500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1508 for them. Where appropriate, I/O interface 1508 may include one or more device or software drivers enabling processor 1502 to drive one or more of these I/O devices. I/O interface 1508 may include one or more I/O interfaces 1508, where appropriate. Although this disclosure describes and illustrates a particular I/O interface, this disclosure contemplates any suitable I/O interface.

In particular embodiments, communication interface 1510 includes hardware, software, or both providing one or more interfaces for communication (such as, for example, packet-based communication) between computer system 1500 and one or more other computer systems 1500 or one or more networks. As an example and not by way of limitation, communication interface 1510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1510 for it. As an example and not by way of limitation, computer system 1500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1500 may include any suitable communication interface 1510 for any of these networks, where appropriate. Communication interface 1510 may include one or more communication interfaces 1510, where appropriate. Although this disclosure describes and illustrates a particular communication interface, this disclosure contemplates any suitable communication interface.

In particular embodiments, bus 1512 includes hardware, software, or both coupling components of computer system 1500 to each other. As an example and not by way of limitation, bus 1512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1512 may include one or more buses 1512, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a computing device:
creating an inter process communication (IPC) channel for communication from a producer process to a consumer process, the IPC channel comprising:
a message buffer mapped to a first virtual address space of a kernel of an operating system executed by the computing device and to a second virtual address space of the consumer process in a user space of the operating system, wherein the message buffer comprises a plurality of segments corresponding to predefined memory blocks of the message buffer and an ownership array indicating which process has permission to modify each segment of the plurality of segments;
sending a sender handle for the message buffer to the producer process;
receiving, by the kernel, a request to send a message from the producer process to the consumer process through the IPC channel, the request comprising a received sender handle;
determining, based on a determination that the received sender handle is the same as the sender handle for the message buffer, that the request is permitted;
responsive to the determination that the request is permitted, writing, by the kernel, the message to a segment of the message buffer using the sender handle, wherein the message written in the segment of the message buffer is accessible to the consumer process through the second virtual address space;
after writing the message to the segment of the message buffer, updating ownership of the segment of the message buffer in the ownership array to indicate that the segment is owned by the consumer process, such that the segment is not overwritten until the consumer consumes the message;
consuming, by the consumer process, the message written in the segment; and
after consuming, by the consumer process, the message written in the segment, updating ownership of the segment of the message buffer in the ownership array to indicate that the segment is available for writing a new message.

2. The method of claim 1, further comprising, by the computing device:
determining whether the consumer process is active; and
responsive to a determination that the consumer process is not active, sending a wakeup notification to the consumer process.

3. The method of claim 1, wherein the kernel has read and write access to the message buffer and the consumer process has read-only access to the message buffer.

4. The method of claim 1, further comprising consuming the message by the consumer process without issuing a system call.

5. The method of claim 1, wherein the message buffer is a circular buffer.

6. The method of claim 1, wherein the IPC channel further comprises a producer counter for identifying a next available segment for producing a next message; and
wherein the method further comprises, prior to writing the message to the message buffer, incrementing a value of the producer counter.

7. The method of claim 1, wherein the message buffer further comprises:
a consumer counter for identifying a next index at which a subsequent message may be consumed; and
a state buffer indicating a consumption state of each message stored in the message buffer.

8. One or more computer-readable non-transitory storage media embodying software that is operable when executed to:
create an inter process communication (IPC) channel for communication from a producer process to a consumer process, the IPC channel comprising:
a message buffer mapped to a first virtual address space of a kernel of an operating system executed by a device and to a second virtual address space of the consumer process in a user space of the operating system, wherein the message buffer comprises a plurality of segments corresponding to predefined memory blocks of the message buffer and an ownership array indicating which process has permission to modify each segment of the plurality of segments;
send a sender handle for the message buffer to the producer process;
receive, by the kernel, a request to send a message from the producer process to the consumer process through the IPC channel, the request comprising a received sender handle;
determine, based on a determination that the received sender handle is the same as the sender handle for the message buffer, that the request is permitted
responsive to the determination that the request is permitted, write, by the kernel, the message to a segment of the message buffer using the sender handle, wherein the message written in the segment of the message buffer is accessible to the consumer process through the second virtual address space;
after writing the message to the segment of the message buffer, update ownership of the segment of the message buffer in the ownership array to indicate that the segment is owned by the consumer process, such that the segment is not overwritten until the consumer consumes the message;
consume, by the consumer process, the message written in the segment; and
after the consumer process consumes the message written in the segment, update ownership of the segment of the message buffer in the ownership array to indicate that the segment is available for writing a new message.

9. The media of claim 8, wherein the software is further operable when executed to:
determine whether the consumer process is active; and
responsive to a determination that the consumer process is not active, send a wakeup notification to the consumer process.

10. The media of claim 8, wherein the kernel has read and write access to the message buffer and the consumer process has read-only access to the message buffer.

11. The media of claim 8, wherein the software is further operable when executed to consume the message by the consumer process without issuing a system call.

12. The media of claim 8, wherein the message buffer is a circular buffer.

13. The media of claim 8, wherein:
the IPC channel further comprises a producer counter for counting a number of messages written to the message buffer; and
the software is further operable when executed to, prior to writing the message to the message buffer, increment a value of the producer counter.

14. The media of claim 8, wherein the message buffer further comprises:
a consumer counter for counting a number of messages to be consumed by the consumer process; and
a state buffer indicating a consumption state of each message stored in the message buffer.

15. A system comprising:
one or more processors; and
one or more computer-readable non-transitory storage media coupled to one or more of the processors and comprising instructions operable when executed by one or more of the processors to cause the system to:
create an inter process communication (IPC) channel for communication from a producer process to a consumer process, the IPC channel comprising:
a message buffer mapped to a first virtual address space of a kernel of an operating system executed by a device and to a second virtual address space of the consumer process in a user space of the operating system, wherein the message buffer comprises a plurality of segments corresponding to predefined memory blocks of the message buffer and an ownership array indicating which process has permission to modify each segment of the plurality of segments;
send a sender handle for the message buffer to the producer process;
receive, by the kernel, a request to send a message from the producer process to the consumer process through the IPC channel, the request comprising a received sender handle;
determine, based on a determination that the received sender handle is the same as the sender handle for the message buffer, that the request is permitted
responsive to the determination that the request is permitted, write, by the kernel, the message to a segment of the message buffer using the sender handle, wherein the message written in the segment of the message buffer is accessible to the consumer process through the second virtual address space;
after writing the message to the segment of the message buffer, update ownership of the segment of the message buffer in the ownership array to indicate that the segment is owned by the consumer process, such that the segment is not overwritten until the consumer consumes the message;
consume, by the consumer process, the message written in the segment; and
after the consumer process consumes the message written in the segment, update ownership of the segment of the message buffer in the ownership array to indicate that the segment is available for writing a new message.

16. The system of claim 15, wherein the processors are further operable when executing the instructions to:
determine whether the consumer process is active; and
responsive to a determination that the consumer process is not active, send a wakeup notification to the consumer process.

17. The system of claim 15, wherein the kernel has read and write access to the message buffer and the consumer process has read-only access to the message buffer.

18. The system of claim 15, wherein the processors are further operable when executing the instructions to consume the message by the consumer process without issuing a system call.

19. The system of claim 15, wherein the message buffer is a circular buffer.

20. The system of claim 15, wherein:
the IPC channel further comprises a producer counter for counting a number of messages written to the message buffer; and
wherein the processors are further operable when executing the instructions to, after writing the message to the message buffer, increment a value of the producer counter.

* * * * *